(12) United States Patent
Li et al.

(10) Patent No.: US 10,588,117 B2
(45) Date of Patent: Mar. 10, 2020

(54) INFORMATION BITS PACKAGING

(71) Applicant: Telefonaktiebolaget LM Ericsson (publ), Stockholm (SE)

(72) Inventors: Shaohua Li, Beijing (CN); Mattias Andersson, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 36 days.

(21) Appl. No.: 15/761,251

(22) PCT Filed: Sep. 23, 2016

(86) PCT No.: PCT/CN2016/099810
§ 371 (c)(1),
(2) Date: Mar. 19, 2018

(87) PCT Pub. No.: WO2017/050265
PCT Pub. Date: Mar. 30, 2017

(65) Prior Publication Data
US 2018/0279266 A1 Sep. 27, 2018

(30) Foreign Application Priority Data
Sep. 25, 2015 (CN) .................. PCT/CN2015/090840

(51) Int. Cl.
*H04W 72/04* (2009.01)
*H04L 1/18* (2006.01)
(Continued)

(52) U.S. Cl.
CPC ........ *H04W 72/042* (2013.01); *H04B 7/0417* (2013.01); *H04B 7/0456* (2013.01);
(Continued)

(58) Field of Classification Search
None
See application file for complete search history.

(56) References Cited

U.S. PATENT DOCUMENTS

2018/0006791 A1* 1/2018 Marinier ............... H04L 1/0026
2018/0167173 A1* 6/2018 Guan .................... H04L 1/1829
(Continued)

FOREIGN PATENT DOCUMENTS

| CN | 102595488 A | 7/2012 |
| EP | 2693823 A2 | 2/2014 |
| WO | 2017030489 A1 | 2/2017 |

OTHER PUBLICATIONS

Extended European Search Report for European Patent Application No. 16848146.3, dated Apr. 11, 2019, 11 pages.
(Continued)

*Primary Examiner* — Saba Tsegaye
(74) *Attorney, Agent, or Firm* — Withrow & Terranova, PLLC

(57) ABSTRACT

The present disclosure relates to packaging of feedback information bits in a wireless communication system. Some embodiments are applicable to both Frequency Division Duplexing (FDD) and Time Division Duplexing (TDD) systems, whereas other embodiments are particularly well-suited for TDD systems. In some embodiments, a method of operation of a wireless device in a cellular communications network comprises receiving, from the cellular communications network, an indication of one of a plurality of predefined sets of feedback information codebook sizes, the plurality of predefined sets of feedback information codebook sizes being disjoint subsets of a plurality of predefined feedback information codebook sizes. In some embodiments, the indication enables the wireless device to return an expected number of feedback information bits to the cellular communications network, particularly in a saturation where the wireless device misses one or more downlink assignments.

16 Claims, 21 Drawing Sheets

(51) Int. Cl.
*H04B 7/0456* (2017.01)
*H04B 7/0417* (2017.01)

(52) U.S. Cl.
CPC .......... *H04L 1/1825* (2013.01); *H04L 1/1861* (2013.01); *H04L 1/1896* (2013.01); *H04W 72/0406* (2013.01)

(56) References Cited

U.S. PATENT DOCUMENTS

2018/0175973 A1\* 6/2018 Rosa ................ H04L 1/1858
2018/0249458 A1\* 8/2018 He .................. H04L 1/1607

OTHER PUBLICATIONS

Author Unknown, "Technical Specification Group Radio Access Network; Evolved Universal Terrestrial Radio Access (E-UTRA); Physical layer precedures (Release 12)," Technical Specification 36.213, Version 12.7.0, 3GPP Organizational Partners, Sep. 2015, 241 pages
Ericsson, "R1-154420: HARQ-ACK transmission for Rel-13 CA enhancement," Third Generation Partnership Project (3GPP), TSG RAN WG1 Meeting #82, Aug. 24-28, 2015, 5 pages, Beijing, China.
Huawei, et al., "R1-153771: HARQ-ACK Codebook determination for carrier aggregation enhancement," Third Generation Partnership Project (3GPP), TSG RAN WG1 Meeting #82, Aug. 24-28, 2015, 7 pages, Beijing, China.
Intel Corporation, "R1-152625: HARQ-ACK feedback for CA with up to 32 CCs," Third Generation Partnership Project (3GPP), TSG-RAN WG1 #81, May 25-29, 2015, 4 pages, Fukuoka, Japan.
Lenovo, "R1-154503: HARQ-ACK codebook determination for Rel-13 eCA," Third Generation Partnership Project (3GPP), TSG RAN WG1 Meeting #82, Aug. 24-28, 2015, 4 pages, Beijing, China.
Samsung, "R1-154117: Discussion on HARQ-ACK codebook determination for eCA," Third Generation Partnership Project (3GPP), TSG RAN WG1 #82, Aug. 24-28, 2015, 4 pages, Beijing, China.
International Search Report and Written Opinion for International Patent Application No. PCT/CN2016/099810, dated Dec. 28, 2016, 12 pages.

\* cited by examiner

INFORMATION BITS PACKAGING

RELATED APPLICATIONS

This application is a 35 U.S.C. § 371 national phase filing of International Application No. PCT/CN2016/099810, filed Sep. 23, 2016, which claims the benefit of PCT patent application serial number PCT/CN2015/090840, filed Sep. 25, 2015, the disclosures of which are hereby incorporated herein by reference in their entireties.

TECHNICAL FIELD

The disclosed subject matter relates generally to telecommunications. Certain embodiments relate more particularly to uplink control channel transmissions (e.g., Physical Uplink Control Channel (PUCCH) transmissions in Third Generation Partnership Project (3GPP) Long Term Evolution (LTE)), Further enhancement Carrier Aggregation (FeCA), and/or Downlink Assignment Index (DAI).

BACKGROUND

Carrier Aggregation (CA)

The use of Long Term Evolution (LTE) Carrier Aggregation, introduced in Third Generation Partnership Project (3GPP) LTE Release (Rel) 10 and enhanced in Rel-11, enables an increase in peak data rates, system capacity, and user experience by aggregating radio resources from multiple carriers that may reside in the same band or different bands and, for the case of inter-band Time Division Duplexing (TDD) CA, may be configured with different uplink/downlink configurations. In 3GPP LTE Rel-12, CA between TDD and Frequency Division Duplexing (FDD) serving cells is introduced to support a User Equipment device (UE) connecting to them simultaneously.

In 3GPP LTE Rel-13, Licensed Assisted Access (LAA) has attracted a lot of interest in extending the LTE CA feature towards capturing the spectrum opportunities of unlicensed spectrum in the 5 Gigahertz (GHz) frequency band. Wireless Local Area Networks (WLANs) currently operating in the 5 GHz frequency band already support 80 Megahertz (MHz) wide channels in the field and will soon support 160 MHz wide channels with the Wave 2 deployment of Institute of Electrical and Electronics Engineers (IEEE) 802.11ac. There are also other frequency bands, such as 3.5 GHz, where aggregation of more than one carrier on the same band is possible, in addition to the bands already widely in use for LTE. Enabling the utilization of at least similar bandwidths for LTE in combination with LAA as used in IEEE 802.11ac Wave 2 will support calls for extending the CA framework to support more than five carriers. The extension of the LTE CA framework beyond five carriers was approved to be one work item for LTE Rel-13. The objective is to support up to 32 carriers in both uplink and downlink.

Compared to single-carrier operation, a UE operating with CA has to report feedback for more than one downlink Component Carrier (CC). Meanwhile, a UE does not need to support downlink and uplink CA simultaneously. For instance, the first release of CA capable UEs in the market only supports downlink CA but not uplink CA. This is also the underlying assumption in the 3GPP Radio Access Network 4 (RAN4) standardization. Therefore, an enhanced uplink control channel, i.e. Physical Uplink Control Channel (PUCCH) format 3, was introduced for CA during the LTE Rel-10 timeframe. However, in order to support more CCs in LTE Rel-13, the uplink control channel capacity becomes a limitation.

PUCCH Format 3

In LTE Rel-8, PUCCH format 1/1a/1b and PUCCH format 2/2a/2b are supported for Scheduling Requests (SR), Hybrid Automatic Repeat Request (HARQ) Acknowledgements (ACKs), and periodic Channel State Information (CSI) reporting. The PUCCH resource is represented by a single scalar index, from which the phase rotation and the orthogonal cover sequence (only for PUCCH format 1/1a/1b) are derived. The use of a phase rotation of a cell-specific sequence together with orthogonal sequences provides orthogonally between different UEs in the same cell transmitting PUCCH on the same set of resource blocks. In LTE Rel-10, PUCCH format 3 was introduced for CA and TDD, when there are multiple downlink transmissions either on multiple carriers or multiple downlink subframes, but a single uplink transmission either on a single carrier or a single uplink subframe for HARQ-ACK, SR, and CSI feedback.

In 3GPP LTE up to Rel-12, the maximum number of downlink CCs is 5. However, in LTE Rel-13, a maximum of 32 downlink CCs can be configured for one UE, and hence a new PUCCH format will be introduced to carry more HARQ-ACK bits due to the aggregation of 32 downlink CCs.

Currently, there are two main design options to support larger payload size on PUCCH:

Option 1: New PUCCH format design based on PUCCH format 3, and

Option 2: New PUCCH format design based on the Physical Uplink Shared Channel (PUSCH).

For Option 2, because it is based on PUSCH, it is more flexible to support different information loads and different resource allocations. Hence, Option 2 is slightly preferred in 3GPP. Currently, the details for a new PUCCH design are under discussion in 3GPP.

SUMMARY

The present disclosure relates to packaging of feedback information bits in a wireless communication system. Some embodiments are applicable to both Frequency Division Duplexing (FDD) and Time Division Duplexing (TDD) systems, whereas other embodiments are particularly well-suited for TDD systems. In some embodiments, a method of operation of a wireless device in a cellular communications network comprises receiving, from the cellular communications network, an indication of one of a plurality of predefined sets of feedback information codebook sizes, the plurality of predefined sets of feedback information codebook sizes being disjoint subsets of a plurality of predefined feedback information codebook sizes. In some embodiments, the indication enables the wireless device to return an expected number of feedback information bits to the cellular communications network, particularly in a saturation where the wireless device misses one or more downlink assignments.

In some embodiments, the indication is an explicit indication of the one of the plurality of predefined sets of feedback information codebook sizes. In some embodiments, the explicit indication is comprised in a downlink control information message.

In some embodiments, the indication is an implicit indication of the one of the plurality of predefined sets of feedback information codebook sizes. In some embodiments, the implicit indication is downlink assignment index ordering used for a plurality of downlink assignments transmitted to the wireless device.

In some embodiments, the plurality of predefined sets of feedback information codebook sizes is a plurality of predefined sets of Hybrid Automatic Repeat Request (HARQ) Acknowledgement (ACK) codebook sizes and the plurality of predefined feedback information codebook sizes is a plurality of predefined HARQ-ACK codebook sizes.

In some embodiments, receiving the indication of one of the plurality of predefined sets of feedback information codebook sizes comprises receiving one or more indications of one or more sets of feedback information codebook sizes from among the plurality of predefined sets of feedback information codebook sizes. The method further comprises receiving, from the cellular communications network, a plurality of downlink assignments for a plurality of Component Carriers (CCs). The plurality of downlink assignments having a respective plurality of downlink assignment indices that form a received downlink assignment index sequence. The method further comprises determining a number of information bits to be transmitted in an uplink channel transmission including information bits for any missing downlink assignments as identified based on the received downlink assignment index sequence as compared to a defined downlink assignment index ordering and determining a smallest codebook size in the set of feedback information codebook sizes indicated by one of the one or more indications that is greater than or equal to the determined number of information bits to be transmitted in the uplink channel transmission. The method further comprises encoding the determined number of information bits using the determined smallest codebook size to provided encoded information bits and transmitting the uplink channel transmission, the uplink channel transmission comprising the encoded information bits. Further, in some embodiments, the plurality of predefined sets of feedback information codebook sizes is a plurality of predefined sets of HARQ-ACK codebook sizes, the plurality of predefined feedback information codebook sizes is a plurality of predefined HARQ-ACK codebook sizes, and the number of information bits to be transmitted in the uplink channel transmission is a number of HARQ-ACK bits.

In some embodiments, the one or more indications comprise an explicit indication of a set of feedback information codebook sizes from among the plurality of predefined sets of feedback information codebook sizes such that receiving the indication comprises receiving the explicit indication. Further, in some embodiments, receiving the explicit indication comprises receiving a downlink control information message comprising the explicit indication, and receiving the plurality of downlink assignments comprises receiving at least one of the plurality of downlink assignments in the downlink control information message together with the explicit indication. In some embodiments, each of plurality of carriers for which the plurality of downlink assignments are received is either a TDD or a FDD carrier.

In some embodiments, the one or more indications comprise a first explicit indication of a first set of feedback information codebook sizes from among the plurality of predefined sets of feedback information codebook sizes and a second explicit indication of a second set of feedback information codebook sizes from among the plurality of predefined sets of feedback information codebook sizes. Further, receiving the one or more indications comprises receiving a first downlink control information message in a first downlink subframe, the first downlink control information message comprising the first explicit indication, the first explicit indication being an indication of the first set of feedback information codebook sizes, where the first set of feedback information codebook sizes includes a first codebook size that is greater than or equal to a number of information bits to be transmitted in the uplink channel transmission based on the number of downlink assignments transmitted to the wireless device in the first downlink subframe. Receiving the one or more indications further comprises receiving a second downlink control information message in a second downlink subframe, the second downlink control information message comprising the second explicit indication, the second explicit indication being an indication of the second set of feedback information codebook sizes, where the second set of feedback information codebook sizes includes a second codebook size that is greater than or equal to an accumulated number of information bits to be transmitted in the uplink channel transmission based on the number of downlink assignments transmitted to the wireless device in the first downlink subframe and the second downlink subframe. Receiving the plurality of downlink assignments comprises receiving at least one first downlink assignment of the plurality of downlink assignments in the first downlink control information message in the first downlink subframe and receiving at least one second downlink assignment of the plurality of downlink assignments in the second downlink control information message in the second downlink subframe.

Further, in some embodiments, determining the smallest codebook size in the set of feedback information codebook sizes indicated by one of the one or more indications that is greater than or equal to the determined number of information bits to be transmitted in the uplink channel transmission comprises determining the smallest codebook size in the set of feedback information codebook sizes indicated by a most recent explicit indication received by the wireless device in a most recent downlink subframe comprising at least one downlink assignment for the wireless device.

In some embodiments, determining the smallest codebook size in the set of feedback information codebook sizes indicated by one of the one or more indications that is greater than or equal to the determined number of information bits to be transmitted in the uplink channel transmission comprises determining the smallest codebook size in the set of feedback information codebook sizes indicated by the second explicit indication comprised in the second downlink subframe.

In some embodiments, the one or more indications comprise a first implicit indication of a first set of feedback information codebook sizes from among the plurality of predefined sets of feedback information codebook sizes and a second implicit indication of a second set of feedback information codebook sizes from among the plurality of predefined sets of feedback information codebook sizes. Receiving the one or more indications of the one or more sets of feedback information codebook sizes from among the plurality of predefined sets of feedback information codebook sizes comprises receiving a first downlink control information message in a first downlink subframe, the first downlink control information message comprising the first implicit indication, the first implicit indication being an implicit indication of the first set of feedback information codebook sizes, where the first set of feedback information codebook sizes includes a first codebook size that is greater than or equal to a number of information bits to be transmitted in the uplink channel transmission based on the number of downlink assignments transmitted to the wireless device in the first downlink subframe. Receiving the one or more indications further comprises receiving a second downlink control information message in a second downlink subframe, the second downlink control information message comprising the second implicit indication, the second implicit indication being an implicit indication of the second set of feedback information codebook sizes, where the second set of feedback information codebook sizes includes a second codebook size that is greater than or equal to an accumulated number of information bits to be transmitted in the uplink channel transmission based on the number of downlink assignments transmitted to the wireless device in the first downlink subframe and the second downlink subframe. Receiving the plurality of downlink assignments comprises receiving at least one first downlink assignment of the plurality of downlink assignments in the first downlink control information message in the first downlink subframe and receiving at least one second downlink assignment of the plurality of downlink assignments in the second downlink control information message in the second downlink subframe.

Further, in some embodiments, different downlink assignment index orderings are assigned to different sets of feedback information codebook sizes, the first implicit indication is a first downlink assignment index ordering assigned to the first set of feedback information codebook sizes, and the second implicit indication is a second downlink assignment ordering assigned to the set of feedback information codebook sizes.

Further, in some embodiments, the second downlink assignment index ordering is a function of a highest logical component carrier index among one or more downlink assignments transmitted to the wireless device in the first downlink subframe.

In some embodiments, the method further comprises determining a shortest downlink assignment sequence, taking into consideration one or more different candidate downlink assignment index ordering sets, that is consistent with the received downlink assignment index sequence. Determining the number of information bits to be transmitted in the uplink channel transmission comprises determining the number of information bits to be transmitted in the uplink channel transmission based on the shortest downlink assignment sequence that is consistent with the received downlink assignment index sequence. Determining the smallest codebook size comprises determining the smallest codebook size, that is greater than or equal to the determined number of information bits to be transmitted in the uplink channel transmission, in the set of feedback information codebook sizes indicated by the downlink assignment index ordering in a most recent downlink subframe comprising at least one of the plurality of downlink assignments.

Embodiments of a wireless device for a cellular communications network are also disclosed. In some embodiments, the wireless device is adapted to receive, from the cellular communications network, an indication of one of a plurality of predefined sets of feedback information codebook sizes, the plurality of predefined sets of feedback information codebook sizes being disjoint subsets of a plurality of predefined feedback information codebook sizes. In some embodiments, the wireless device is further adapted to perform the method of operation of the wireless device according to any one of the embodiments disclosed herein.

In some embodiments, a wireless device for a cellular communications network comprises a transceiver, a processor, and memory comprising instructions executable by the processor whereby the wireless device is operable to receive, from the cellular communications network, an indication of one of a plurality of predefined sets of feedback information codebook sizes, the plurality of predefined sets of feedback information codebook sizes being disjoint subsets of a plurality of predefined feedback information codebook sizes.

In some embodiments, a wireless device a cellular communications network comprises a receiving module operable to receive, from the cellular communications network, an indication of one of a plurality of predefined sets of feedback information codebook sizes, the plurality of predefined sets of feedback information codebook sizes being disjoint subsets of a plurality of predefined feedback information codebook sizes.

Embodiments of a method of operation of a radio access node in a cellular communications network are also disclosed. In some embodiments, the method of operation of the radio access node comprises providing, to a wireless device, an indication of one of a plurality of predefined sets of feedback information codebook sizes, the plurality of predefined sets of feedback information codebook sizes being disjoint subsets of a plurality of predefined feedback information codebook sizes.

In some embodiments, the indication is an explicit indication of the one of the plurality of predefined sets of feedback information codebook sizes. Further, in some embodiments, the explicit indication is comprised in a downlink control information message.

In some embodiments, the indication is an implicit indication of the one of the plurality of predefined sets of feedback information codebook sizes. Further, in some embodiments, the implicit indication is downlink assignment index ordering used for a plurality of downlink assignments transmitted to the wireless device.

In some embodiments, the plurality of predefined sets of feedback information codebook sizes is a plurality of predefined sets of HARQ-ACK codebook sizes and the plurality of predefined feedback information codebook sizes is a plurality of predefined HARQ-ACK codebook sizes.

In some embodiments, providing the indication of one of the plurality of predefined sets of feedback information codebook sizes comprises providing one or more indications of one or more sets of feedback information codebook sizes from among the plurality of predefined sets of feedback information codebook sizes. The method further comprises transmitting, to the wireless device, a plurality of downlink assignments for a plurality of CCs, the plurality of downlink assignments having a respective plurality of downlink assignment indices that form a received downlink assignment index sequence. The method further comprises receiving an uplink channel transmission from the wireless device, the uplink channel transmission comprising encoded information bits, and decoding the encoded information bits. Further, in some embodiments, the plurality of predefined sets of feedback information codebook sizes is a plurality of predefined sets of HARQ-ACK codebook sizes, the plurality of predefined feedback information codebook sizes is a plurality of predefined HARQ-ACK codebook sizes, and the encoded information bits comprise a number of encoded HARQ-ACK bits.

In some embodiments, the one or more indications comprise an explicit indication of a set of feedback information codebook sizes from among the plurality of predefined sets of feedback information codebook sizes such that providing the indication comprises providing the explicit indication. Further, in some embodiments, providing the explicit indication comprises transmitting a downlink control information message comprising the explicit indication, and transmitting the plurality of downlink assignments comprises transmitting at least one of the plurality downlink assignments in the downlink control information message together with the explicit indication.

In some embodiments, each of a plurality of carriers for which the plurality of downlink assignments are transmitted is either a TDD or FDD, carrier.

In some embodiments, the one or more indications comprise a first explicit indication of a first set of feedback information codebook sizes from among the plurality of predefined sets of feedback information codebook sizes and a second explicit indication of a second set of feedback information codebook sizes from among the plurality of predefined sets of feedback information codebook sizes. Providing the one or more indications comprises transmitting a first downlink control information message in a first downlink subframe, the first downlink control information message comprising the first explicit indication, the first explicit indication being an indication of the first set of feedback information codebook sizes, where the first set of feedback information codebook sizes includes a first codebook size that is greater than or equal to a number of information bits to be transmitted in the uplink channel transmission based on the number of downlink assignments transmitted to the wireless device in the first downlink subframe. Providing the one or more indications further comprises transmitting a second downlink control information message in a second downlink subframe, the second downlink control information message comprising the second explicit indication, the second explicit indication being an indication of the second set of feedback information codebook sizes, where the second set of feedback information codebook sizes includes a second codebook size that is greater than or equal to an accumulated number of information bits to be transmitted in the uplink channel transmission based on the number of downlink assignments transmitted to the wireless device in the first downlink subframe and the second downlink subframe. Transmitting the plurality of downlink assignments comprises transmitting at least one first downlink assignment of the plurality of downlink assignments in the first downlink control information message in the first downlink subframe and transmitting at least one second downlink assignment of the plurality of downlink assignments in the second downlink control information message in the second downlink subframe.

In some embodiments, the one or more indications comprise a first implicit indication of a first set of feedback information codebook sizes from among the plurality of predefined sets of feedback information codebook sizes and a second implicit indication of a second set of feedback information codebook sizes from among the plurality of predefined sets of feedback information codebook sizes. Providing the one or more indications of the one or more sets of feedback information codebook sizes from among the plurality of predefined sets of feedback information codebook sizes comprises transmitting a first downlink control information message in a first downlink subframe, the first downlink control information message comprising the first implicit indication, the first implicit indication being an implicit indication of the first set of feedback information codebook sizes, where the first set of feedback information codebook sizes includes a first codebook size that is greater than or equal to a number of information bits to be transmitted in the uplink channel transmission based on the number of downlink assignments transmitted to the wireless device in the first downlink subframe. Providing the one or more indications further comprises transmitting a second downlink control information message in a second downlink subframe, the second downlink control information message comprising the second implicit indication, the second implicit indication being an implicit indication of the second set of feedback information codebook sizes, where the second set of feedback information codebook sizes includes a second codebook size that is greater than or equal to an accumulated number of information bits to be transmitted in the uplink channel transmission based on the number of downlink assignments transmitted to the wireless device in the first downlink subframe and the second downlink subframe. Transmitting the plurality of downlink assignments comprises transmitting at least one first downlink assignment of the one or more downlink assignments in the first downlink control information message in the first downlink subframe and transmitting at least one second downlink assignment of the one or more downlink assignments in the second downlink control information message in the second downlink subframe.

Further, in some embodiments, different downlink assignment index orderings are assigned to different sets of feedback information codebook sizes, the first implicit indication is a first downlink assignment index ordering assigned to the first set of feedback information codebook sizes, and the second implicit indication is a second downlink assignment ordering assigned to the set of feedback information codebook sizes.

Further, in some embodiments, the second downlink assignment ordering is a function of a highest logical CC index among one or more downlink assignments transmitted to the wireless device in the first downlink subframe.

Embodiments of a radio access node for a cellular communications network are also disclosed. In some embodiments, the radio access node is adapted to provide, to a wireless device, an indication of one of a plurality of predefined sets of feedback information codebook sizes, the plurality of predefined sets of feedback information codebook sizes being disjoint subsets of a plurality of predefined feedback information codebook sizes. In some embodiments, the radio access node is further adapted to perform the method of operation of the radio access node according to any one of the embodiments disclosed herein.

In some embodiments, a radio access node for a cellular communications network comprises a transceiver, a processor, and memory comprising instructions executable by the processor whereby the radio access node is operable to provide, to a wireless device, an indication of one of a plurality of predefined sets of feedback information codebook sizes, the plurality of predefined sets of feedback information codebook sizes being disjoint subsets of a plurality of predefined feedback information codebook sizes.

In some embodiments, a radio access node for a cellular communications network comprises a providing module operable to provide, to a wireless device, an indication of one of a plurality of predefined sets of feedback information codebook sizes, the plurality of predefined sets of feedback information codebook sizes being disjoint subsets of a plurality of predefined feedback information codebook sizes.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The following description presents various embodiments of the disclosed subject matter. These embodiments are presented as teaching examples and are not to be construed as limiting the scope of the disclosed subject matter. For example, certain details of the described embodiments may be modified, omitted, or augmented without departing from the scope of the described subject matter.

1 Problems

In Third Generation Partnership Project (3GPP) Physical Uplink Control Channel (PUCCH) design, one open issue is on how to package information bits in new PUCCH format. It includes how to decide feedback package length in the new PUCCH format and how to order the information bits. It should be mentioned here that the information bits may include Hybrid Automatic Repeat Request (HARQ) feedback and/or Channel State Information (CSI) feedback and/ or Scheduling Request (SR) or other bits used to facilitate system operation, all of which are referred to herein as types of feedback information bits. But for simplicity, HARQ feedback bits are used in the example described herein in order to show the problems and the corresponding solutions. There are two options being considered for the feedback package length determination, namely:

Option 1: The HARQ feedback position for each Component Carrier (CC) is dependent only on configured CCs.

Option 2: The HARQ feedback position for each CC is dependent on the scheduled CCs.

For Option 1, the length of the HARQ feedback bits is semi-static. When the number of configured CCs is large but the number of the scheduled CCs is smaller, a lot of known bits will be inserted into PUCCH. The known bits can be employed to get performance improvement and compensate the energy waste on these known bits. Simulation results show that when the ratio of the known bits over the unknown bits is large, it will lead to great performance loss.

For Option 2, the length of the HARQ feedback bits is determined by the scheduled CCs. In this case, all the information bits are valid information bits, and it is not necessary to insert any known bits in the HARQ information transmission. However, the missing of some Downlink Control Information (DCI) grants will lead to ambiguity of the length of HARQ feedback bits. Specially, the missing of the last DCI grants will be dominant to lead to the ambiguity of the package length.

Figure 1:
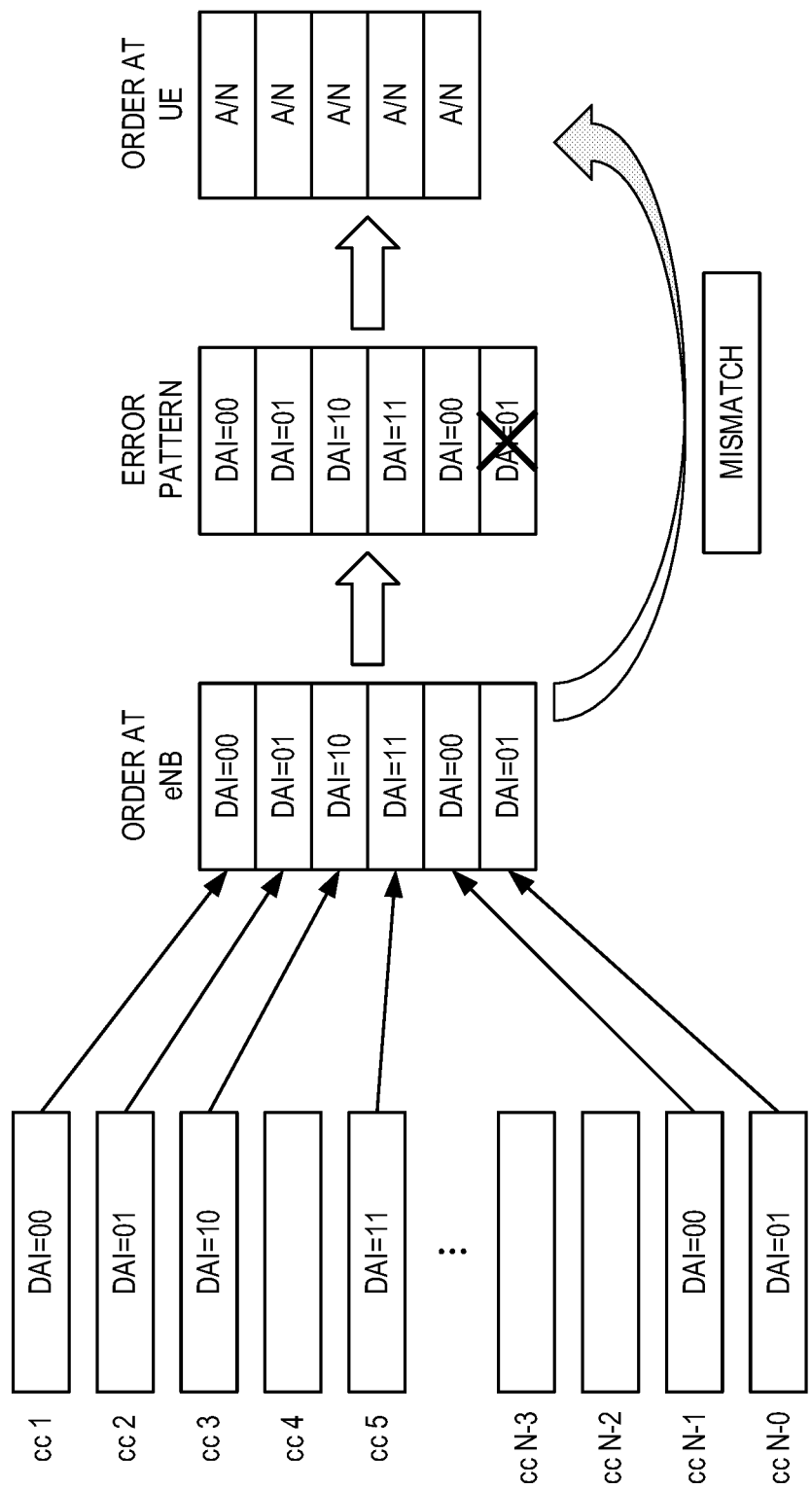
FIG. 1 illustrates one example of a problem addressed by embodiments of the present disclosure.

To illustrate this problem, one example is given in FIG. 1. In this example, two bits in each DCI grant will be used to indicate a Downlink Assignment Index (DAI). Based on the DAI and the ordering of the DAI, the User Equipment device (UE) can decide the HARQ Acknowledgement/ Negative Acknowledgment (ACK/NACK) position for each CC and the length of the total HARQ feedback bits. For example, assume N=32 CCs are configured and six CCs are scheduled, where the six scheduled CCs are {cc1, cc2, cc3, cc5, cc31, cc32}. The logical indices of these scheduled CCs (logical_index_of_scheduled_CC) is {0, 1, 2, 3, 4, 5}. The DAI can be defined as:

$$DAI = mod(logical\_index\_of\_scheduled\_CC, 4).$$

Here, mod(•) is the modulo operation. The DAI for these scheduled CCs is therefore {00, 01, 10, 11, 00, 10}, as shown in FIG. 1.

If the UE does not miss any of the DCI grants, both the base station (i.e., the enhanced or evolved Node B (eNB)) and the UE will assume six CCs are scheduled. However, if for example the DCI grant on cc32 is missed by the UE, the base station will assume six CCs are scheduled, while the UE will assume five CCs are scheduled. Consequently, assuming two HARQ ACK/NACK bits are needed for each CC, the UE will use 10 bits to form the HARQ feedback package. However, the base station will still assume 12 bits for the package length because the base station does not have any information on the UE detection status, which will lead to a decoding error at the base station.

Assume that there are N CCs, the scheduling probability for each CC is p, and the miss detection of each CC is $p_d$. Then, the probability for information length ambiguity due to missing the last DAI grants at the UE can be given by:

$$\sum_{k=1}^{N} C_N^k p^k (1-p)^{N-k} p_d$$

where $C_N^k$ is the number of combinations of N items taken k. Assuming that $p_d$ is 1%, the probability for information length ambiguity is very close to the DCI miss detection probability. This error will lead to the probability of NACK to ACK exceed far from 0.1% and the probability of ACK to NACK exceed 1%. In other words, if there is ambiguity between the eNB and the UE, the eNB will get incorrect ACK/NACK information since the decoding is incorrect if the length of the information bits is incorrect. Under this assumption, the decoding error probability will be 10%, assuming that there is 10% probability for a missing DCI. Thus, if the UE sends a NACK, the eNB may get ACK or NACK randomly after decoding. The probability of this event happing is 10% in this example. Thus, the probability of the UE sending a NACK and the eNB receiving an ACK is 0.5*10%=5%, in this example.

2 Solution Based on DAI Counting Order

Certain solutions to the aforementioned problem are based on the DAI counting order (also referred to herein as DAI ordering). The following is a brief example of one such solution.

Let two bits in each DCI grant be used to indicate the DAI. Based on the DAI and the ordering of the DAI, the UE can decide the HARQ ACK/NACK position for each CC and the length of the total HARQ feedback bits (i.e., the total number of HARQ feedback bits). Again using the example of FIG. 1, assume N=32 CCs are configured and six CCs are scheduled, where the six scheduled CCs are:

{cc1, cc2, cc3, cc5, cc31, cc32}

The logical index of these scheduled CCs (logical_index_of_scheduled_CC) is {0, 1, 2, 3, 4, 5}. The DAI can be DAI=mod (logical_index_of_scheduled_CC, 4). Here, mod(•) is the modulo operation. The DAI for these scheduled CCs is {00, 01, 10, 11, 00, 10}, as shown in FIG. 1.

If the UE does not miss any of the DCI grants, both the base station and the UE will assume six CCs are scheduled. However, if for example the DCI grant on cc32 is missed at the UE, the base station will assume that six CCs are scheduled, while the UE will assume five CCs are scheduled. Consequently, assuming that two ACK/NACK bits are needed for each CC, the UE will use 10 bits to form the HARQ feedback package. However, the base station will still assume 12 bits for the package length because the base station has no information on the UE detection status, which will lead to a decoding error at the base station. To solve this ambiguity, the following solution was proposed.

Assume that the UE is only allowed to use codebook sizes in {8, 16, 24, . . . , 8M}. Further, the DAI ordering DAI=mod (CC logical index, 4) is used if the number of bits to be reported is in the set {8, 24, 40, . . . }, and the DAI ordering DAI=3−mod (CC logical index, 4) is used if the number of bits to be reported is in the complement, i.e. {16, 32, 48, . . . }.

At the UE side, the UE tries to determine which ordering was used, and then the UE uses this to determine the codebook size. As an example, assuming the same six scheduled carriers as in FIG. 1, the DAI ordering from the base station will be (11, 10, 01, 00, 11, 10), because the number of bits to be reported is 16. Assume that the assignments for cc31 and cc32 are missing. In this case, the transmitted DAI ordering is (11, 10, 01, 00, 11, 10), but the received DAI ordering is (11, 10, 01, 00). Using such an algorithm, the two most likely sequences from the two orderings are:

(00, 01, 10, 11, 00, 01, 10, 11, 00, 01, 10, 11, 00, 01, 10, 11, 00), and (11, 10, 01, 00, 00), respectively, where boldface bits correspond to received scheduling assignments. The UE can determine that the second ordering was used and knows to report 16 bits. Assuming even more CCs are missing, such as cc3, cc5, cc31, and cc32, the UE can still determine the correct codebook size. Using such an algorithm the received sequence is (11, 10) and the two most likely sequences from the two orderings are (00, 01, 10, 11, 00, 01, 10, 11, 01) and (11, 10, 01, 00, 11) respectively. The UE determines that the second ordering is the most likely and transmits 16 bits. More than two sets of bit numbers and corresponding orderings may be possible.

3 Embodiments of the Present Disclosure

Certain embodiments described herein address a problem encountered when using approaches such as that described above in Section 2. In particular, certain embodiments address problems with the approach described above when applied for Time Division Duplexing (TDD). The problem with the approach described above when applied directly to TDD is that the base station needs to decide how many CCs in total to schedule when scheduling the first downlink subframe in a set of several contiguous downlink subframes. Otherwise, if the base station makes a scheduling decision in later downlink subframes, the base station needs to make a scheduling decision that is consistent with the DAI ordering already used in earlier downlink subframes. This is unwanted because it reduces the scheduling flexibility at the base station.

Embodiments of the present disclosure relate to multiple solutions that help solve the codebook size ambiguity at the UE. The first solution is applicable to both TDD and Frequency Division Duplexing (FDD), while the second, third, and fourth solutions are applicable to TDD. All four solutions use a partitioning of the allowed codebook sizes for information bits into disjoint sets.

For the first solution, the base station explicitly signals, in the DCI message, which of the sets of allowed codebook sizes to which the expected codebook size belongs. The second solution extends the first solution to the TDD case.

For the third solution, to allow the base station to make independent scheduling decisions in each downlink subframe, the DAI ordering in each downlink subframe is chosen assuming that there are no more downlink assignments to the UE in subsequent downlink subframes. This means that the DAI ordering might change between downlink subframes if the number of scheduled CCs in the current downlink subframe causes the total codebook size to change. The fourth solution changes the third solution by using a different DAI ordering.

The first and second solutions allow the communication of the codebook size to the UE using a smaller payload while still being resilient to errors. The third and fourth solutions apply to TDD.

In the following description, all the information bit lengths do not include Cyclic Redundancy Check (CRC) bits. Here, the information bits are extended to including HARQ feedback bits, and/or CSI bits, and/or SR bits or other bits which are required for feedback.

All solutions use partitioning of allowed codebook sizes into disjoint sets. As an example, the set of codebook lengths could be the set of natural numbers smaller than or equal to a predefined number N: $\{1, 2, 3, 4, \ldots, N\}$ and they could be partitioned into even and odd numbers: $\{1, 3, 5, \ldots, N-1\}$ or $\{2, 4, 6, \ldots, N\}$. Another example set used later in this section is $\{8, 16, 24, 32, 40, 48, \ldots\}$ with the partitioning $\{8, 24, 40, 56, \ldots\}$ and $\{16, 32, 48, 64, \ldots\}$. The UE determines the codebook size using the methods described herein and feeds back the Uplink Control Information (UCI), putting any extra bits to zero. Note that the set of codebook sizes can be partitioned into more than two disjoint sets.

Before describing embodiments of the various solutions disclosed herein, a brief discussion on one example embodiment of a communication network in which embodiments of the present disclosure may be implemented is presented. The described embodiments may be implemented in any appropriate type of communication system supporting any suitable communication standards and using any suitable components. As one example, certain embodiments may be implemented in a Long Term Evolution (LTE) or more generally a cellular communications network, such as that illustrated in FIG. 2.

Figure 2:
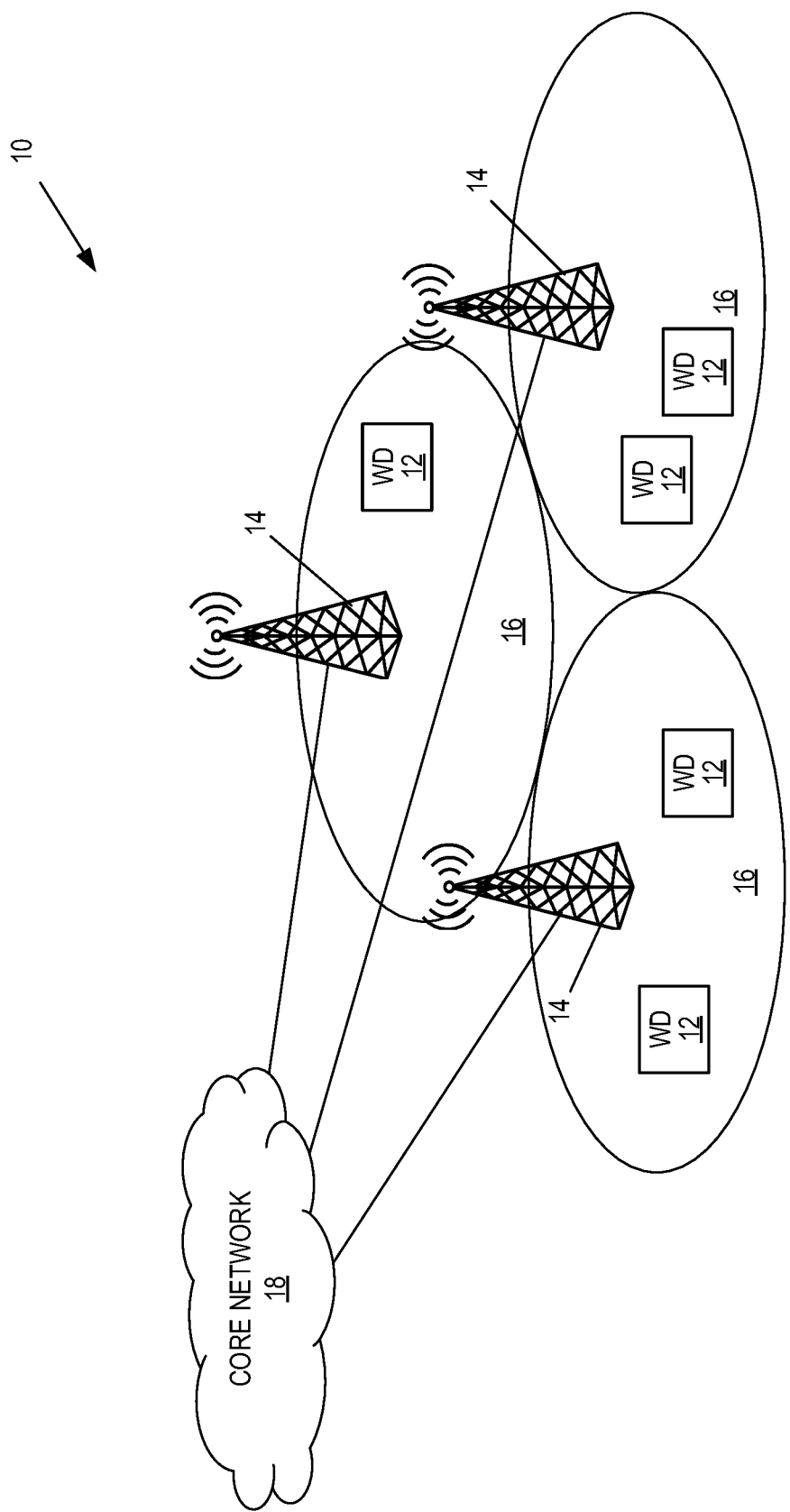
FIG. 2 illustrates one example of a communication network in which embodiments of the present disclosure may be implemented.

Referring to FIG. 2, a communication network 10 comprises a plurality of wireless communication devices 12 (e.g., conventional UEs, Machine Type Communication (MTC)/Machine-to-Machine (M2M) UEs) and a plurality of radio access nodes 14 (e.g., eNBs or other base stations). The communication network 10 is organized into cells 16, which are connected to a core network 18 via the corresponding radio access nodes 14. The radio access nodes 14 are capable of communicating with the wireless communication devices 12 along with any additional elements suitable to support communication between the wireless communication devices 12 or between a wireless communication device 12 and another communication device (such as a landline telephone).

3.1 Solution 1: Explicit Signaling of Codebook Partition to which the Expected Codebook Size Belongs 3.1.1 at the Radio Access Node Side An embodiment for a FDD system is first described. Here, the radio access node 14 (e.g., eNB) knows the size of the feedback bits when scheduling the first CC. As used herein, "feedback bits" include HARQ ACK/NACK bits, CSI feedback bits, and/or SR bits to other bits used for system operation. The radio access node 14 can then determine which of the allowed codebook sizes to use, and to which partition this codebook size belongs. The radio access node 14 then separately signals this partition to the wireless communications device 12 (e.g., UE) e.g., through an extra field in the DCI. This signal can be sent in all or some of the Physical Downlink Control Channel (PDCCH) in which the downlink assignments are scheduled.

3.1.2 at the Wireless Communication Device Side

Unless the wireless communication device 12 (e.g., UE) misses all downlink assignments in which the codebook partition is signaled, the wireless communication device 12 knows to which partition the codebook size belongs. The wireless communication device 12 first finds the number of HARQ bits to be fed back, using the DAI to find any missed assignments. The wireless communication device 12 then finds the smallest codebook size in this partition that is larger than or equal to the number of HARQ bits to be fed back, and encodes the HARQ bits using this codebook size. If the wireless communication device 12 misses all downlink assignments with this DCI field, the wireless communication device 12 chooses the codebook size from the set of all allowed codebook sizes.

3.1.3 System Operation for Solution 1

Figure 3:
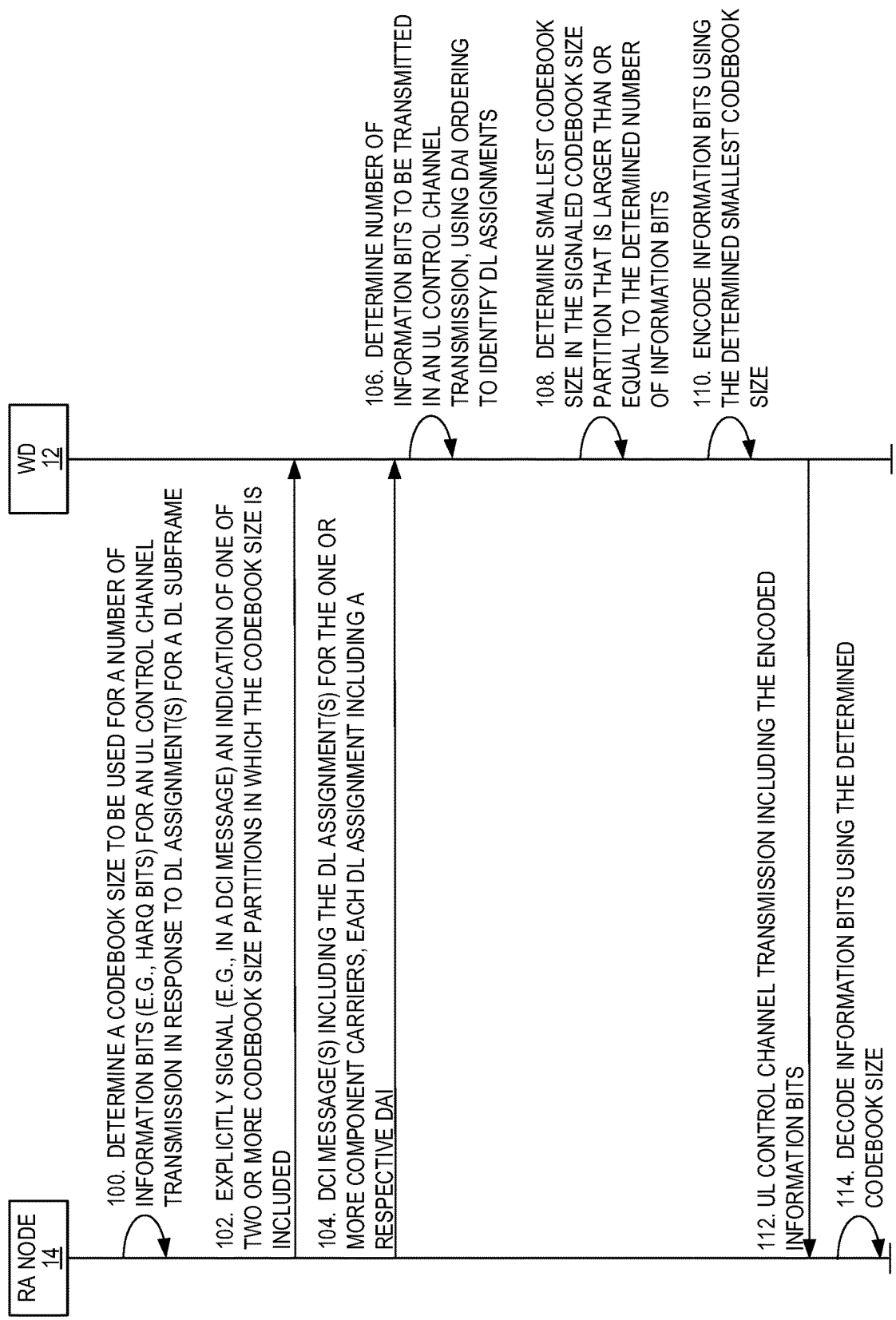
FIG. 3 illustrates the operation of a radio access node and a wireless communication device according to one example of embodiments relating to a first solution disclosed herein.

FIG. 3 illustrates the operation of a radio access node 14 and a wireless communication device 12 according to one example of the embodiments relating to solution 1 described above. As illustrated, the radio access node 14 determines a codebook size to be used for a number of information bits (e.g., HARQ feedback bits) for an uplink control channel (e.g., PUCCH) transmission in response to downlink assignments for a number of CCs in a downlink subframe (step 100). For example, if the downlink subframe includes downlink assignments for the wireless communication device 14 for M CCs and two information bits are to be transmitted by the wireless communication device 12 on a respective uplink control channel in response to the downlink assignments for the M CCs, then the radio access node 14 determines that there are 2×M information bits to be transmitted on the uplink control channel. Then, the wireless communication device 12 determines the information bit codebook size from the predefined set of codebook sizes needed for transmission of the determined number of information bits (i.e., the smallest predefined codebook size in the predefined set of codebook sizes that is greater than or equal to the determined number of information bits). The predefined set of codebook sizes is divided into a predefined number of disjoint subsets, or partitions. The determined codebook size belongs to only one of the partitions.

The radio access node 14 explicitly signals, to the wireless communication device 12, an indication of the one of the two or more predefined codebook size partitions, or subsets, in which the determined codebook size is included (step 102). In some embodiments, the indication is a bit(s) for bit field in a DCI message. The radio access node 14 also transmits one or more DCI messages to the wireless communication device 12 including the downlink assignments for one or more, but preferably multiple, CCs (step 104). Each downlink assignment includes a respective DAI. Further, the DAIs are used in a predefined DAI sequence ordering, or DAI ordering (e.g., DAI=mod(CC_logical_index, 4). In some embodiments, the explicit indication from step 102 is included in at least one of the DCI messages of step 104.

At the wireless communication device 12, upon receiving the explicit signaling of the indication of the codebook size partition and the downlink assignment(s) for the CC(s), the wireless communication device 12 determines the number of information bits to be transmitted in an uplink control channel transmission, using DAI to identify downlink assignments (step 106). More specifically, the received downlink assignments have respective DAIs. Further, the DAIs are provided in a predefined DAI ordering (e.g., DAI=mod(CC_logical_index, 4)). Upon receiving some subset of the downlink assignments transmitted by the radio access node 14 considering that one or more of the downlink assignments may be missed by the wireless communication device 12, the wireless communication device 12 can compare the DAIs of the received downlink assignments to the predefined DAI ordering to thereby determine whether any downlink assignments were missed. For example, assume that:

the radio access node 14 transmits downlink assignments for six CCs to the wireless communication device 12 where the respective CC logical indices are: 0, 1, 2, 3, 4, and 5, the DAI ordering is defined as: DAI=mod(CC_logical_index, 4) for the codebook size partition {8, 24, 40, . . . } and DAI=3−mod(CC_logical_index, 4) for the codebook size partition {16, 32, 48, . . . }, and The number of information bits needed per CC is 2.

Thus, in this example, the number of information bits expected by the radio access node 14 to be transmitted in the uplink control channel transmission by the wireless communication device 12 is twelve (i.e., 6 CCs×2 information bits per CC=12 information bits). The smallest codebook size is the predefined set of codebook sizes for the information bits that is greater than or equal to the expected number of information bits is 16 (i.e., the determined codebook size in step 100 is 16), and the codebook size partition explicitly signaled in step 102 is the second codebook size partition, {16, 32, 48, . . . }. Using the DAI ordering for the second codebook size partition, the transmitted DAI sequence (i.e., the sequence of DAIs for the downlink assignments for the six CCs transmitted by the radio access node 14) is: (11, 10, 01, 00, 11, 10). At the wireless communication device 12, assume as an example that the wireless device 12 misses the DAI assignment for the CC having the logical index 3. Then, the received DAI sequence at the wireless communication device 12 will be: (11, 10, 01, 11, 10). By comparing the received DAI sequence to the predefined DAI sequence for the second codebook size partition, the wireless communication device 12 is able to determine that the DAI assignment for the CC logical index 3 was missed and, as such, determine that the number of information bits to be transmitted in the uplink control channel transmission is 12 (i.e., 6 CCs×2 information bits per CC=12 bits) rather than 10 (i.e., 5 CCs×2 information bits per CC=10 bits).

Once the wireless communication device 12 has determined the number of information bits to be transmitted in the uplink control channel, the wireless communication device 12 determines the smallest codebook size in the signaled codebook size partition that is greater than or equal to the determined number of information bits (step 108). Continuing the example above, the determined number of information bits is 12 and the signaled codebook size partition is {16, 32, 48, . . . }. As such, the wireless communication device 12 determines that the a codebook size of 16 is the smallest codebook size that can be used. The wireless communication device 12 then encodes the determined number of information bits using the determined smallest codebook size in the explicitly signaled codebook size partition (step 110). Notably, predetermined bits are inserted for the missed downlink assignment (e.g., HARQ NACK bits are inserted for the CC that corresponds to the missed downlink assignment). Here, the information bits include, e.g., the HARQ ACK/NACK bits for the respective CCs, CSI bits, and/or SR or other bits used for system operation. The wireless communication device 12 then transmits an uplink control channel transmission including the encoded information bits (step 112).

At the radio access node 14, the radio access node 14 receives the uplink control channel transmission and decodes the encoded information bits using the codebook size determined in step 100 (step 114).

3.2 Solution 2: Explicit Signaling, the TDD Case 3.2.1 at the Radio Access Node Side In the TDD case, at the time the radio access node 14 (e.g., eNB) schedules the downlink assignments, the radio access node 14 does not know the total number of HARQ bits to be fed back, because additional downlink assignments can be scheduled in later downlink subframes, which could change the codebook size. The radio access node 14 solves this by counting the number of accumulated HARQ bits to be fed back in the associated uplink subframe and signaling which codebook size partition the needed codebook size belongs to, assuming that there are no downlink assignments in any further downlink subframes associated with the same uplink subframe.

For example, assume that the allowed codebook sizes are given by {8, 16, 24, . . . , 8M}, and are partitioned into the two sets: {8, 24, 40, . . . } and {16, 32, 48, . . . }. The first set is signaled by setting the bit in a respective DCI field to 0, and the second set is signaled by setting the bit in the DCI field to 1. For this example, it is assumed that each scheduled CC requires two HARQ bits, the extra bit is signaled in each downlink assignment, and the DAI is signaled using two bits in the DCI field. It is also assumed that there are two downlink subframes for each uplink subframe. If the wireless communication device 12 (e.g., UE) schedules three CCs in the first subframe and two CCs in the second subframe, the DAI field and the extra bit will be given by the following.

| CC | (DAI field, extra bit) first DL subframe | (DAI field, extra bit) second DL subframe |
|---|---|---|
| 0 | | |
| 1 | (00, 0) | (11, 1) |
| 2 | | (00, 1) |
| 3 | (01, 0) | |
| 4 | (10, 0) | |

After the first subframe, there will be three total downlink assignments scheduled, requiring six HARQ bits. The smallest codebook size accommodating six bits is eight, which belongs to partition 0, so the extra bit in the DCI is set to 0. After the second subframe, there will five total downlink assignments scheduled, requiring ten HARQ bits. The smallest codebook size accommodating ten bits is 16, which belongs to partition 1, so the extra bit in the DCI is set to 1.

3.2.2 at the Wireless Communication Device Side

The wireless communication device 12 (e.g., UE) determines from which partition to look for the codebook size using the downlink assignments from the last subframe where the wireless communication device 12 detected downlink assignments. Then, the wireless communication device 12 operates as described above with respect to Solution 1. If all detected downlink assignments in the last subframe in which the wireless communication device 12 detected any downlink assignments lack the extra DCI field, the wireless communication device 12 chooses the codebook size from the total set of allowed codebook sizes, and then operates as described above with respect to Solution 1.

3.2.3 System Operation for Solution 2

Figure 4A:
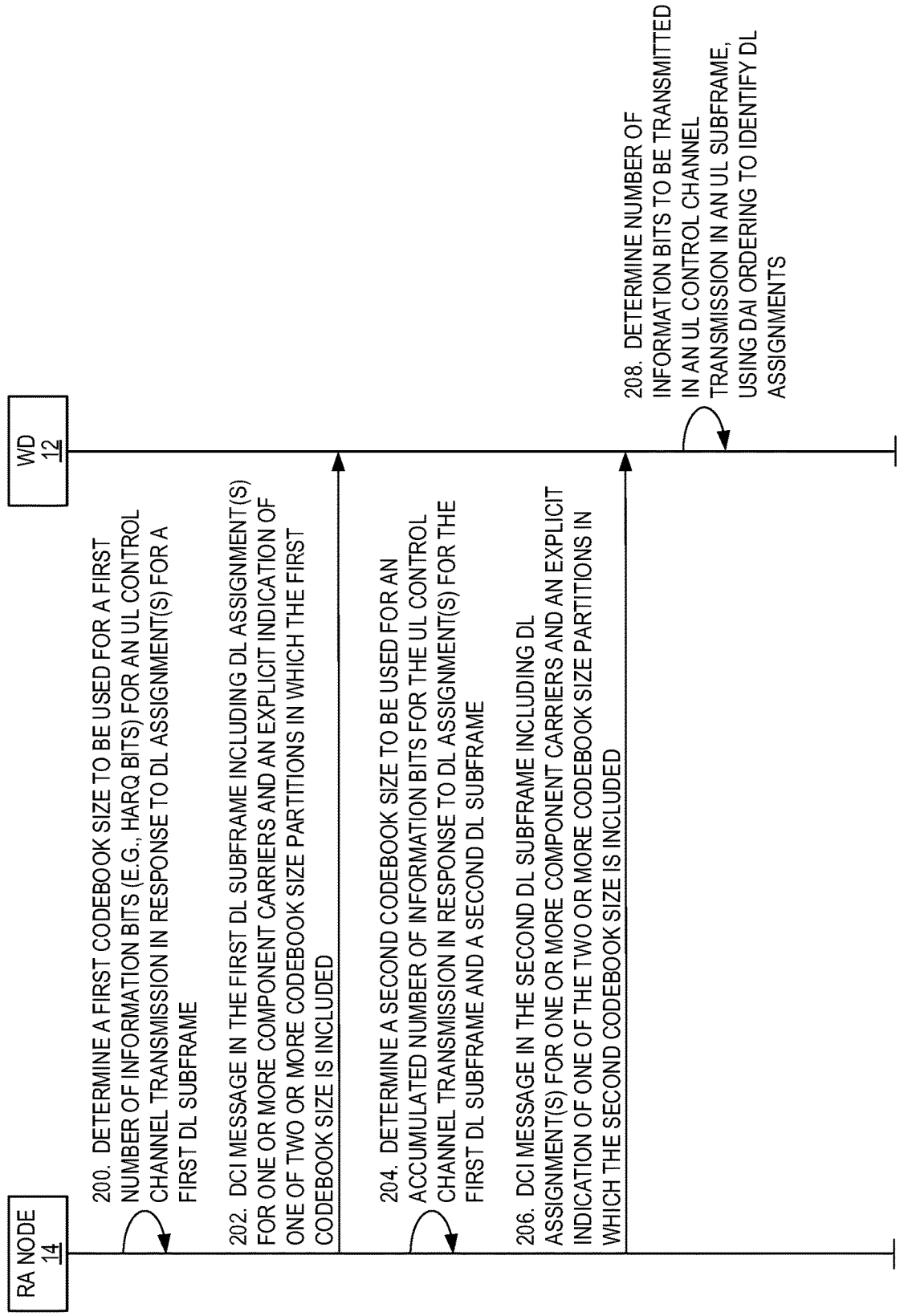
FIGS. 4A and 4B illustrate the operation of a radio access node and a wireless communication device according to one example of embodiments relating to a second solution disclosed herein.
Figure 4B:
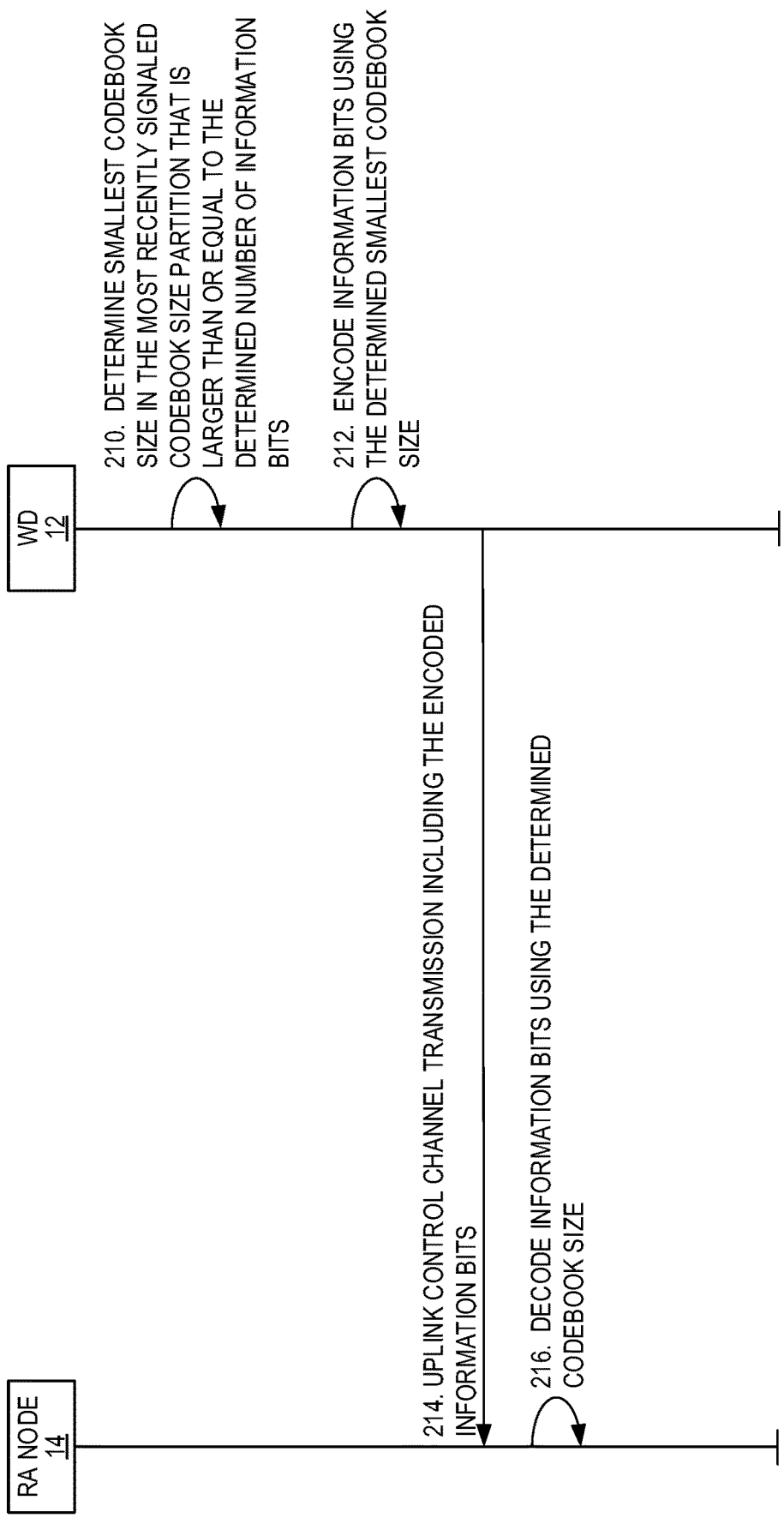

FIGS. 4A and 4B illustrate the operation of a radio access node 14 and a wireless communication device 12 according to one example of the embodiments relating to solution 2 described above. In general, there are multiple consecutive downlink subframes in the uplink/downlink configuration that are associated with the same uplink subframe. The radio access node 14 transmits DCI messages in two or more of the downlink subframes. In each downlink subframe, the radio access node 14 also transmits an explicit indication of a codebook size partition that includes a codebook size needed for transmission of an accumulated number of information bits in the associated uplink subframe. The accumulated number of information bits is the total number of information bits to be transmitted by the wireless communication device 12 in the associated uplink subframe considering the number of downlink assignments transmitted to the wireless communication device 12 in that downlink subframe and any preceding downlink subframe(s) in the multiple consecutive downlink subframes. For example, if downlink assignments are transmitted from the radio access node 14 to the wireless communication device 12 in two of the consecutive downlink subframes, then the radio access node 14 will transmit an explicit indication in the first downlink subframe of the codebook size partition that includes the codebook size needed for transmission of a number of information bits resulting from the downlink assignment(s) in the first downlink subframe. In the second downlink subframe, the radio access node 14 will transmit an explicit indication of the codebook size partition that includes the codebook size needed for transmission of an accumulated, or total, number of information bits resulting from the downlink assignments in the first and second downlink subframes.

Looking at the example embodiment of FIGS. 4A and 4B, the radio access node 14 determines a codebook size to be used for a first number of information bits (e.g., HARQ feedback bits) for a uplink control channel (e.g., PUCCH) transmission in an uplink subframe in response to downlink assignments for a number of CCs in a first downlink subframe (step 200). In this example, the first downlink subframe is a downlink subframe in a number of consecutive downlink subframes in a TDD uplink/downlink configuration for the communication network 10. The multiple consecutive downlink subframes are associated with the same uplink subframe for purposes of transmission of uplink control channel information from the wireless communication device 12.

As an example, if the first downlink subframe includes downlink assignments for the wireless communication device 12 for M CCs and two information bits are to be transmitted by the wireless communication device 12 on a respective uplink control channel in the associated uplink subframe in response to the downlink assignments for the M CCs, then the radio access node 14 determines that there are 2×M information bits to be transmitted on the uplink control channel. The wireless communication device 12 then determines the codebook size from the predefined set of codebook sizes needed for transmission of the determined number of information bits (i.e., the smallest predefined codebook size in the predefined set of codebook sizes that is greater than or equal to the determined number of information bits). Again, the predefined set of codebook sizes is divided into a predefined number of disjoint subsets, or partitions. The determined codebook size belongs to only one of the partitions.

The radio access node 14 explicitly signals, to the wireless communication device 12, an indication of the one of the two or more predefined codebook size partitions, or subsets, in which the determined codebook size included. More specifically, in this example, the radio access node 14 transmits a DCI message to the wireless communication device 12 in the first downlink subframe, where the DCI message includes at least one of the downlink assignments for the wireless communication device 12 and at least one of an explicit indication of the codebook size partition in which the first codebook size is included (step 202). Note that the DCI message may include multiple downlink assignments for different CCs or may include only one downlink assignment for one CC. The DCI message may include multiple explicit indications or may include only one explicit indication. Further, in some embodiments, the radio access node 14 may transmit multiple DCI messages in the first downlink subframe, where at least one or potentially all of the DCI messages include the explicit indication of the codebook size.

The radio access node 14 also determines a codebook size to be used for an accumulated number of information bits (e.g., HARQ feedback bits) for the uplink control channel (e.g., PUCCH) transmission in the uplink subframe in response to downlink assignments for a number of CCs in the first downlink subframe and a second downlink subframe (step 204). As an example, if the first downlink subframe includes downlink assignments for the wireless communication device 12 for M1 CCs, the second downlink subframe includes downlink assignments for the wireless communication device 12 for M2 CCs, and two information bits are to be transmitted by the wireless communication device 12 on the uplink control channel in the associated uplink subframe for each downlink assignment, then the radio access node 14 determines that the accumulated number of information bits to be transmitted on the uplink control channel is 2×(M1+M2). Then, the wireless communication device 12 determines the information bit codebook size (i.e., the second codebook size) from the predefined set of codebook sizes needed for transmission of the determined accumulated number of information bits (i.e., the smallest predefined codebook size in the predefined set of codebook sizes that is greater than or equal to the determined accumulated number of information bits).

The radio access node 14 explicitly signals, to the wireless communication device 12, an indication of the codebook size partition, or subsets, in which the determined accumulated codebook size is included. More specifically, in this example, the radio access node 14 transmits a DCI message to the wireless communication device 12 in the second downlink subframe, where the DCI message includes at least one of the downlink assignments for the wireless communication device 12 and an explicit indication of the codebook size partition in which the second codebook size is included (step 206). Note that the DCI message may include multiple downlink assignments for different CCs or may include only one downlink assignment for one CC. Further, in some embodiments, the radio access node 14 may transmit multiple DCI messages including the downlink assignments for the wireless communication device 12, where at least one or potentially all of the DCI messages include the explicit indication of the second codebook size.

At the wireless communication device 12, upon receiving the explicit signaling of the indication of the first and second codebook size partitions and the downlink assignment(s) for the CC(s) in the first and second downlink subframes, the wireless communication device 12 determines the number of information bits to be transmitted in an uplink control channel transmission in the associated uplink subframe, using DAI ordering to identify downlink assignments (step 208). More specifically, the received downlink assignments have respective DAIs. Further, the DAIs are provided in a predefined DAI ordering (e.g., DAI=mod(CC_logical_index, 4) for one codebook size partition and DAI=3−mod (CC_logical_index, 4) in another codebook size partition). Upon receiving some subset of the downlink assignments transmitted by the radio access node 14 in the first and second downlink subframes considering that one or more of the downlink assignments may be missed by the wireless communication device 12, the wireless communication device 12 can compare the DAIs of the received downlink assignments to one or more candidate sets of DAI orderings for the first and second downlink subframes to thereby determine whether any downlink assignments were missed. For example, assume that:

the radio access node 14 transmits downlink assignments for three CCs to the wireless communication device 12 in the first downlink subframe and downlink assignments for two CCs to the wireless communication device 12 in the second downlink subframe where the respective CC logical indices are: 0, 1, 2, 3, and 4, the number of information bits needed per CC is 2, and the DAI ordering is defined as: DAI=mod(CC_logical_index, 4) for the codebook size partition {8, 24, 40, . . . } and DAI=3−mod(CC_logical_index, 4) for the codebook size partition {16, 32, 48, . . . } such that:

the transmitted DAI sequence for the first downlink subframe is (00, 01, 10) since six information bits are needed, and the transmitted DAI sequence for the second downlink subframe is (00, 11) since 10 total information bits are needed.

Thus, in this example, the number of information bits expected by the radio access node 14 to be transmitted in the uplink control channel transmission by the wireless communication device 12 is ten (i.e., 5 CCs×2 information bits per CC=12 information bits). The smallest codebook size is the predefined set of codebook sizes for the information bits that is greater than or equal to the expected number of information bits is 16 (i.e., the determined second codebook size in step 204 is 16). The codebook size partition explicitly signaled in step 202 in the first downlink subframe is the first codebook size partition, {8, 24, 40, . . . }, and the codebook size partition explicitly signaled in step 206 in the second downlink subframe is the second codebook size partition, {16, 32, 48, . . . }. Using the DAI ordering for first codebook size partition for the first downlink subframe and the second codebook size partition for the second downlink subframe, the transmitted DAI sequence (i.e., the sequence of DAIs for the downlink assignments for the six CCs transmitted by the radio access node 14 is: (00, 01, 10), (00, 11). At the wireless communication device 12, assume as an example that the wireless communication device 12 misses the DAI assignment for the CC having the logical index 3. Then, the received DAI sequence at the wireless communication device 12 will be: (00, 01, 10), (11). By comparing the received DAI sequence to the predefined DAI sequences for the first and second codebook size partitions, the wireless communication device 12 is able to determine that the DAI assignment for the CC logical index 3 was missed and, as such, determine that the number of information bits to be transmitted in the uplink control channel transmission is 10 (i.e., 5 CCs×2 information bits per CC=10 bits) rather than 8 (i.e., 4 CCs×2 information bits per CC=8 bits).

Once the wireless communication device 12 has determined the number of information bits to be transmitted in the uplink control channel, the wireless communication device 12 determines the smallest codebook size in the most recently signaled codebook size partition that is greater than or equal to the determined number of information bits (step 210). Continuing the example above, the determined number of information bits is 10 and the codebook size partition signaled in the second downlink subframe is the second codebook size partition, i.e., {16, 32, 48, . . . }. As such, the wireless communication device 12 determines that the codebook size of 16 is the smallest codebook size that can be used. The wireless communication device 12 then encodes the determined number of information bits using the determined smallest codebook size in the explicitly signaled codebook size partition (step 212). Notably, predetermined bits are inserted for the missed downlink assignment (e.g., HARQ NACK bits are inserted for the CC that corresponds to the missed downlink assignment). Here, the information bits include, e.g., the HARQ ACK/NACK bits for the respective CCs, CSI bits, and/or SR or other bits used for system operation. The wireless communication device 12 then transmits an uplink control channel transmission including the encoded information bits (step 214).

At the radio access node 14, the radio access node 14 receives the uplink control channel transmission and decodes the encoded information bits using the codebook size determined in step 204 (step 216). Note that while the example of FIGS. 4A and 4B uses only two downlink subframes, there may be more downlink subframes depending on the uplink/downlink configuration.

3.3 Solution 3: The DAI Depends on the Logical Index of the Scheduled CC

Solutions 3 and 4 apply to the TDD case. As in Solution 2 above, the radio access node 14 (e.g., eNB) counts the number of accumulated HARQ bits to be fed back in the associated uplink subframe and signals which partition the needed codebook size belongs to, assuming that there are no downlink assignments in any further downlink subframes associated with the same uplink subframe. The difference is that the signaling is done through the DAI ordering instead of through a dedicated DCI field. Each partition of the set of allowed codebook sizes is associated with a DAI ordering. The DAI ordering used in a certain downlink subframe is the one which corresponds to the codebook size needed to feedback the total number of HARQ bits assuming that the wireless communication device 12 (e.g., UE) is not scheduled in any later downlink subframes.

3.3.1 at the Radio Access Node Side

In this solution, the ordering of the DAI may change between subframes, but the DAI index chosen only depends on the logical index of the scheduled CC. It is assumed that the DAI index is conveyed using two bits. In the simplest example, two different DAI orderings are used. Let the possible codebook sizes be given by $\{8, 16, 24, \ldots, 8M\}$, and let the ordering DAI=mod (CC logical index, 4) be used if the number of bits to be reported is in the set $\{8, 24, 40, \ldots\}$ and let the ordering DAI=3−mod (CC logical index, 4) be used if the number of bits to be reported is in the complement, i.e. $\{16, 32, 48, \ldots\}$.

Figure 5:
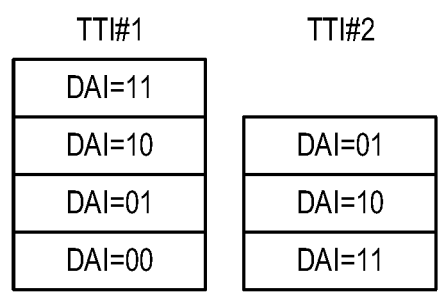
FIG. 5 illustrates one example of using Downlink Assignment Index (DAI) ordering to implicitly signal codebook size partition according to some embodiments of the present disclosure.

Assume that there are two downlink subframes, or TTIs, for every uplink subframe and that each scheduled CC requires two HARQ-bits to be fed back. Assume that the radio access node 14 (e.g., eNB) schedules four CCs in downlink TTI #1 (i.e., a first downlink subframe) and three CCs in downlink TTI #2 (i.e., a second downlink subframe), as depicted in FIG. 5. Because four CCs require eight HARQ bits, the radio access node 14 uses the first DAI ordering in downlink TTI #1, and the DAI indices for the first four CCs are given by [00, 01, 10, 11], because the CC logical indices are 0, 1, 2, and 3. In downlink TTI #2, the radio access node 14 schedules three CCs. This gives in total seven CCs scheduled which requires 14 HARQ bits to be fed back. This in turn requires the use of the codebook of size 16, which is associated with the second DAI ordering. The logical indices of the CCs in downlink TTI #2 are 4, 5, and 6; so, the DAI for them are given by [11, 10, 01]. In general, the set of codebook sizes could be partitioned into more than one subset, and each subset would then be associated with a different ordering. Also note that the different orderings used could be any possible ordering. In particular, any ordering of the form DAI=mod(k1−CC logical index, 4) or DAI=mod (k2+CC logical index, 4), where k1=0, 1, 2, 3 and k2=0, 1, 2, 3 could be used.

In one embodiment the ordering is DAI=mod (CC logical index, 4) for the set $\{8, 24, 40, \ldots\}$, and DAI=mod (−CC logical index, 4) for the set $\{16, 32, 48, \ldots\}$.

If k3 bits for the DAI is used the orderings could for example be DAI=mod(k1−CC logical index, $2^{k3}$) or DAI=mod(k2+CC logical index, $2^{k3}$), where K1=0, 1, ..., ($2^{k3}$−1), and k2=0, 1, ..., ($2^{k3}$−1).

3.3.2 at the Wireless Communication Device Side

The wireless communication device 12 (e.g., UE) determines the shortest sequence of scheduling assignments consistent with the received sequence of DAIs. This can be done using a process from the following family of processes described below.

First, a candidate ordering is defined. A candidate ordering is an ordering for each downlink TTI. For example, if there are three possible orderings labeled 0, 1, and 2 and three downlink TTIs, a candidate ordering would be (0, 2, 2). This candidate ordering would mean that ordering 0 was used in TTI #1, ordering 2 was used in TTI #2, and ordering 2 was used in TTI #3.

The process can then be described as follows:
1. Generate a set of candidate orderings. For details see below.
2. For each candidate ordering, create the shortest sequence of scheduling assignments that would have been consistent with the received sequence of DAIs. This is done by inserting extra DAI bits before the first set of DAI bits, after the last set of DAI bits, and between received sets of DAI bits. Note that a consistent sequence needs to take into account the ordering used for each TTI.
3. Choose the shortest sequence of scheduling assignments among all candidate orderings.

When the wireless communication device 12 has determined the shortest sequence, the wireless communication device 12 assumes that this corresponds to the correct scheduling assignment and generates the HARQ feedback accordingly. The wireless communication device 12 reports NACK for any missed assignments and for any extra bits needed to reach the full codebook size.

The reason that the process described above is referred to herein as a family of processes is that step 1 above can be done in different ways.

A first way is to choose all possible candidate orderings.

A second way is to use an algorithm described in Section 2 above for the first TTI and use the most likely orderings, i.e. the orderings consistent with the shortest sequences, for each separate TTI.

A third way is to first determine the ordering giving the shortest sequence for TTI #1. For the second TTI, the ordering is chosen that gives the shortest sequence and is consistent with TTI #1. This is then repeated for all downlink TTIs for which HARQ feedback is to be sent.

An example is now given using the same scheduled CCs and orderings as in FIG. 5. Assume that the wireless communication device 12 misses the fourth assignment in TTI #1 and the second assignment in TTI #2, and that the set of candidate orderings are all possible orderings. The forward orderings are denoted by F and the backward ordering is denoted by B. The received DAI sequence is 00, 01, 10 in TTI #1 and 11, 01 in TTI #2, which is denoted by ([00, 01, 10], [11, 01]).

For a candidate DAI ordering (F,F) for TTI #1 and TTI #2, the shortest sequence is ([00, 01, 10], [11, 00, 01, 10, 11, 00]).

For candidate DAI ordering (F,B) for TTI #1 and TTI #2, two possible sequences are ([00, 01, 10, 11], [11, 10, 01]) and ([00, 01, 10], [01, 00, 11, 10, 01]), and the first is chosen because it is the shortest of the two. Note that if the first TTI ends with 10, the second TTI needs to start with 01, the DAI index for CC logical index 3 in the backwards ordering.

For candidate DAI ordering (B,F) for TTI #1 and TTI #2, there are three shortest sequences. They are ([11, 10, 01, 00, 11, 10, 01, 00, 11, 10, 01, 00, 11], [01, 10, 11, 00, 01]), and ([11, 10, 01, 00, 11, 10, 01, 00, 11, 10, 01, 00, 11, 10], [10, 11, 00, 01]), and ([11, 10, 01, 00, 11, 10, 01, 00, 11, 10, 01, 00, 11, 10, 01], [11, 00, 01]). Note that this is not a problem, because if one of these would be the shortest sequence, they all would result in the same HARQ feedback because they only differ in missed assignments which are reported as NACK.

For candidate DAI ordering (B,B) for TTI #1 and TTI #2, there are again more than one possible shortest sequence. Here, only the sequence ([11, 10, 01, 00, 11, 10, 01, 00, 11, 10, 01, 00, 11], [10, 01, 00, 11, 10, 01, 00, 11]) is shown as an example.

The wireless communication device 12 finally chooses ([00, 01, 10, 11], [11, 10, 01]), which is the shortest sequence among all those for the candidate DAI orderings and also the correct sequence.

3.3.3 System Operation for Solution 3

Figure 6A:
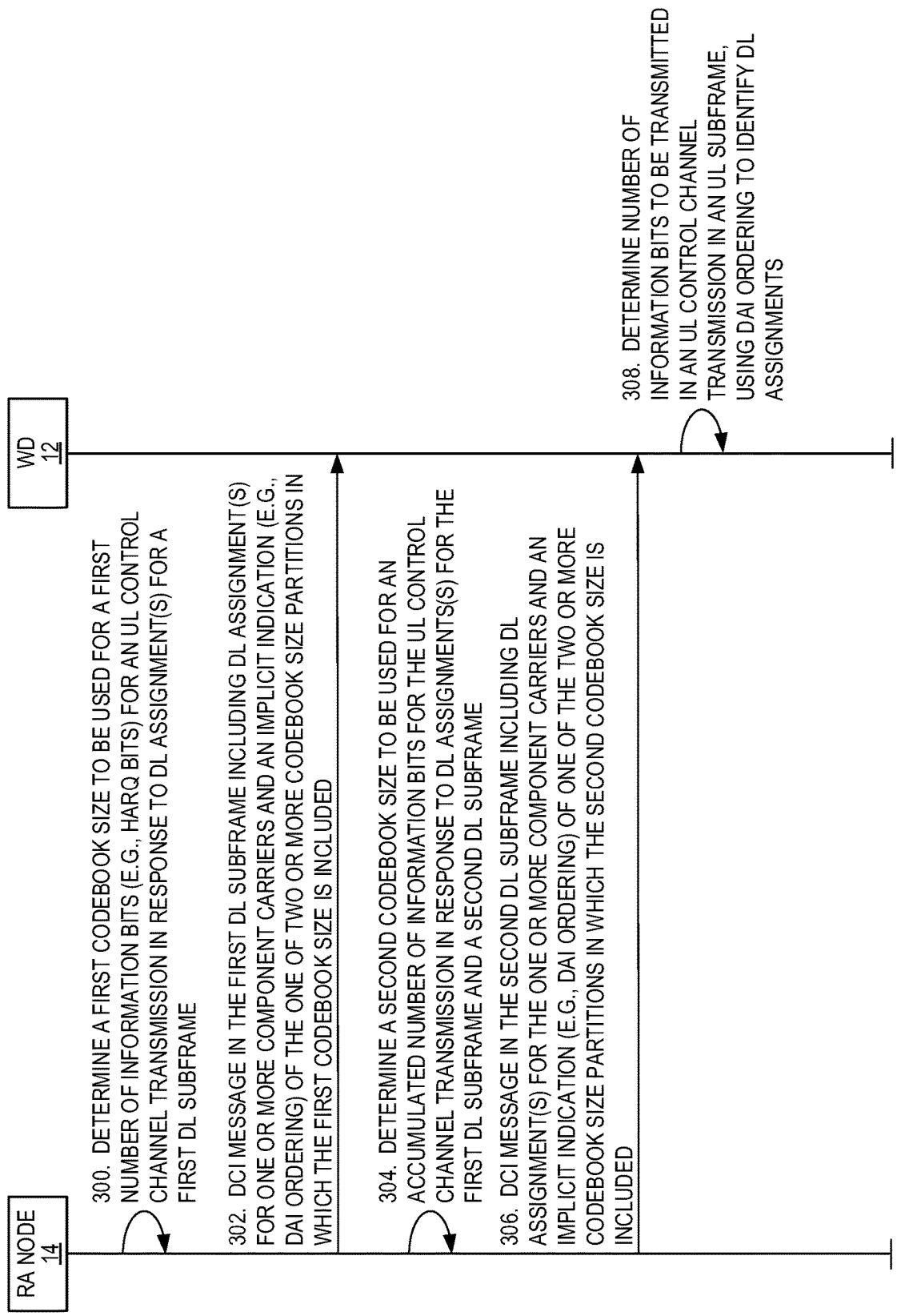
FIGS. 6A and 6B illustrate the operation of a radio access node and a wireless communication device according to one example of embodiments relating to implicit signaling of codebook size partitions disclosed herein.
Figure 6B:
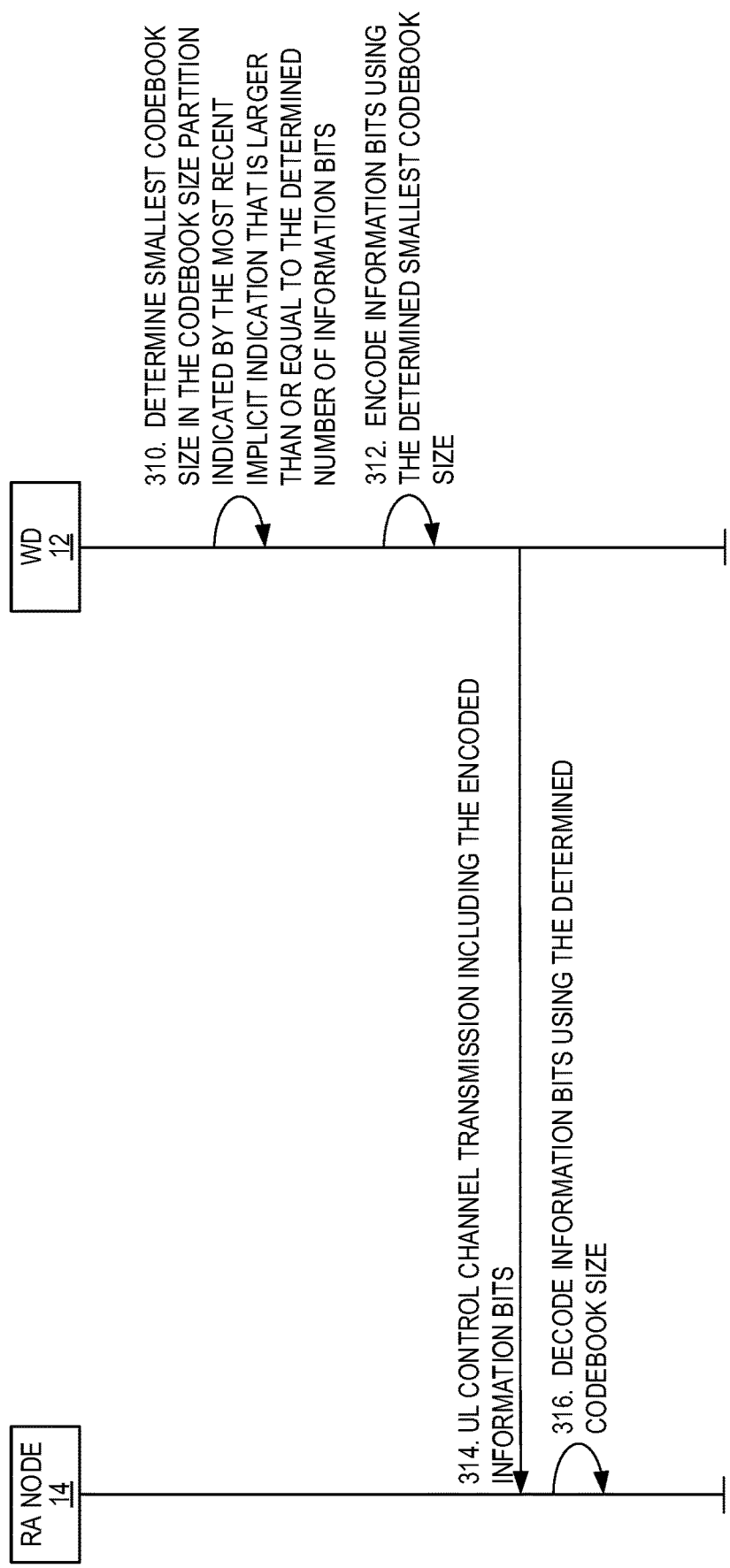

FIGS. 6A and 6B illustrate the operation of a radio access node 14 and a wireless communication device 12 according to one example of the embodiments relating to solution 3 described above. In general, there are multiple consecutive downlink subframes in the uplink/downlink configuration that are associated with the same uplink subframe. The radio access node 14 transmits downlink assignments to the wireless communication device 12 in two or more of the downlink subframes. In each downlink subframe, the radio access node 14 also provides an implicit indication of a codebook size partition that includes a codebook size needed for transmission of an accumulated number of information bits in the associated uplink subframe. The implicit indication is, in some embodiments, the DAI ordering used for the downlink assignments transmitted in the downlink subframe, where different DAI orderings are used for different codebook size partitions.

Looking at the example embodiment of FIGS. 6A and 6B, the radio access node 14 determines a codebook size to be used for a first number of information bits (e.g., HARQ feedback bits) for an uplink control channel (e.g., PUCCH) transmission in an uplink subframe in response to downlink assignments for a number of CCs in a first downlink subframe (step 300). In this example, the first downlink subframe is a downlink subframe in a number of consecutive downlink subframes in a TDD uplink/downlink configuration for the wireless communication system 10. The multiple consecutive downlink subframes are associated with the same uplink subframe for purposes of transmission of uplink control channel information from the wireless communication device 12.

As an example, if the first downlink subframe includes downlink assignments for the wireless communication device 12 for M CCs and two information bits are to be transmitted by the wireless communication device 12 on a respective uplink control channel in the associated uplink subframe in response to the downlink assignments for the M CCs, then the radio access node 14 determines that there are 2×M information bits to be transmitted on the uplink control channel. The wireless communication device 12 then determines the codebook size from the predefined set of codebook sizes needed for transmission of the determined number of information bits (i.e., the smallest predefined codebook size in the predefined set of codebook sizes that is greater than or equal to the determined number of information bits). Again, the predefined set of codebook sizes is divided into a predefined number of disjoint subsets, or partitions. The determined codebook size belongs to only one of the partitions.

The radio access node 14 implicitly signals, to the wireless communication device 12, an indication of the predefined codebook size partition, or subset, in which the determined codebook size included. More specifically, in this example, the radio access node 14 transmits a DCI message to the wireless communication device 12 in the first downlink subframe, where the DCI message includes at least one of the downlink assignments for the wireless communication device 12 and an implicit indication of the codebook size partition in which the first codebook size is included (step 302). In some embodiments, the implicit indication is the DAI ordering used for the downlink assignments transmitted in the first downlink subframe. Note that the DCI message may include multiple downlink assignments for different CCs or may include only one downlink assignment for one CC. Further, in some embodiments, the radio access node 14 may transmit multiple DCI messages in the first downlink subframe, where at least one or potentially all of the DCI messages include the implicit indication of the codebook size.

The radio access node 14 also determines a codebook size to be used for an accumulated number of information bits (e.g., HARQ feedback bits) for the uplink control channel (e.g., PUCCH) transmission in the uplink subframe in response to downlink assignments for a number of CCs in the first downlink subframe and a second downlink subframe (step 304). As an example, if the first downlink subframe includes downlink assignments for the wireless communication device 12 for M1 CCs, the second downlink subframe includes downlink assignments for the wireless communication device 12 for M2 CCs, and two information bits are to be transmitted by the wireless communication device 12 on the uplink control channel in the associated uplink subframe for each downlink assignment, then the radio access node 14 determines that the accumulated number of information bits to be transmitted on the uplink control channel is 2×(M1+M2). Then, the wireless communication device 12 determines the information bit codebook size (i.e., the second codebook size) from the predefined set of codebook sizes needed for transmission of the determined accumulated number of information bits (i.e., the smallest predefined codebook size in the predefined set of codebook sizes that is greater than or equal to the determined accumulated number of information bits).

The radio access node 14 implicitly signals, to the wireless communication device 12, an indication of the codebook size partition, or subsets, in which the determined accumulated codebook size is included. More specifically, in this example, the radio access node 14 transmits a DCI message to the wireless communication device 12 in the second downlink subframe, where the DCI message includes at least one of the downlink assignments for the wireless communication device 12 and an implicit indication of the codebook size partition in which the second codebook size is included (step 306). Again, in some embodiments, the implicit indication is the DAI ordering used for the downlink assignments transmitted in the second downlink subframe. Note that the DCI message may include multiple downlink assignments for different CCs or may include only one downlink assignment for one CC. Further, in some embodiments, the radio access node 14 may transmit multiple DCI messages including the downlink assignments for the wireless communication device 12, where at least one or potentially all of the DCI messages include the implicit indication of the second codebook size.

At the wireless communication device 12, upon receiving the implicit signaling of the indication of the first and second codebook size partitions and the downlink assignment(s) for the CC(s) in the first and second downlink subframes, the wireless communication device 12 determines the number of information bits to be transmitted in an uplink control channel transmission in the associated uplink subframe, using DAI ordering to identify downlink assignments (step 308). More specifically, using the implicit indications and the receive DAI sequence for the downlink subframes as compared to the predefined DAI sequences for the implicitly signaled codebook size partitions, the wireless communication device 12 determines the number of information bits to be transmitted, including any information bits needed for any missed downlink assignments.

Once the wireless communication device 12 has determined the number of information bits to be transmitted in the uplink control channel, the wireless communication device 12 determines the smallest codebook size in the most recently signaled codebook size partition that is greater than or equal to the determined number of information bits (step 310). The wireless communication device 12 then encodes the determined number of information bits using the determined smallest codebook size in the explicitly signaled codebook size partition (step 312). Notably, predetermined bits are inserted for the missed downlink assignment (e.g., HARQ NACK bits are inserted for the CC that corresponds to the missed downlink assignment). Here, the information bits include, e.g., the HARQ ACK/NACK bits for the respective CCs, CSI bits, and/or SR or other bits used for system operation. The wireless communication device 12 then transmits an uplink control channel transmission including the encoded information bits (step 314).

At the radio access node 14, the radio access node 14 receives the uplink control channel transmission and decodes the encoded information bits using the codebook size determined in step 304 (step 316). Note that while the example of FIGS. 6A and 6B uses only two downlink subframes, there may be more downlink subframes depending on the uplink/downlink configuration.

Figure 7A:
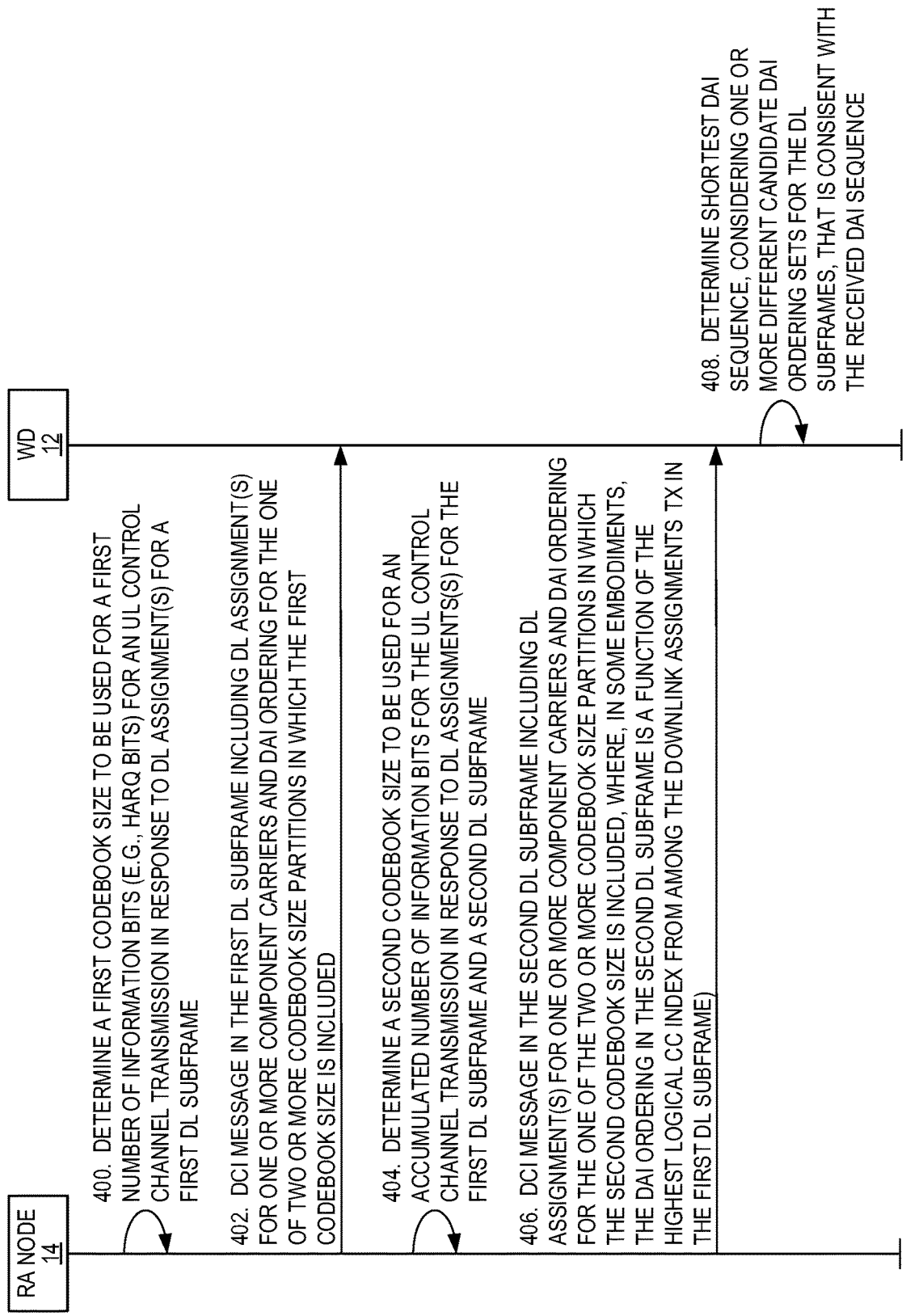
FIGS. 7A and 7B illustrate the operation of a radio access node and a wireless communication device according to one example of embodiments relating to a third and fourth solution disclosed herein.
Figure 7B:
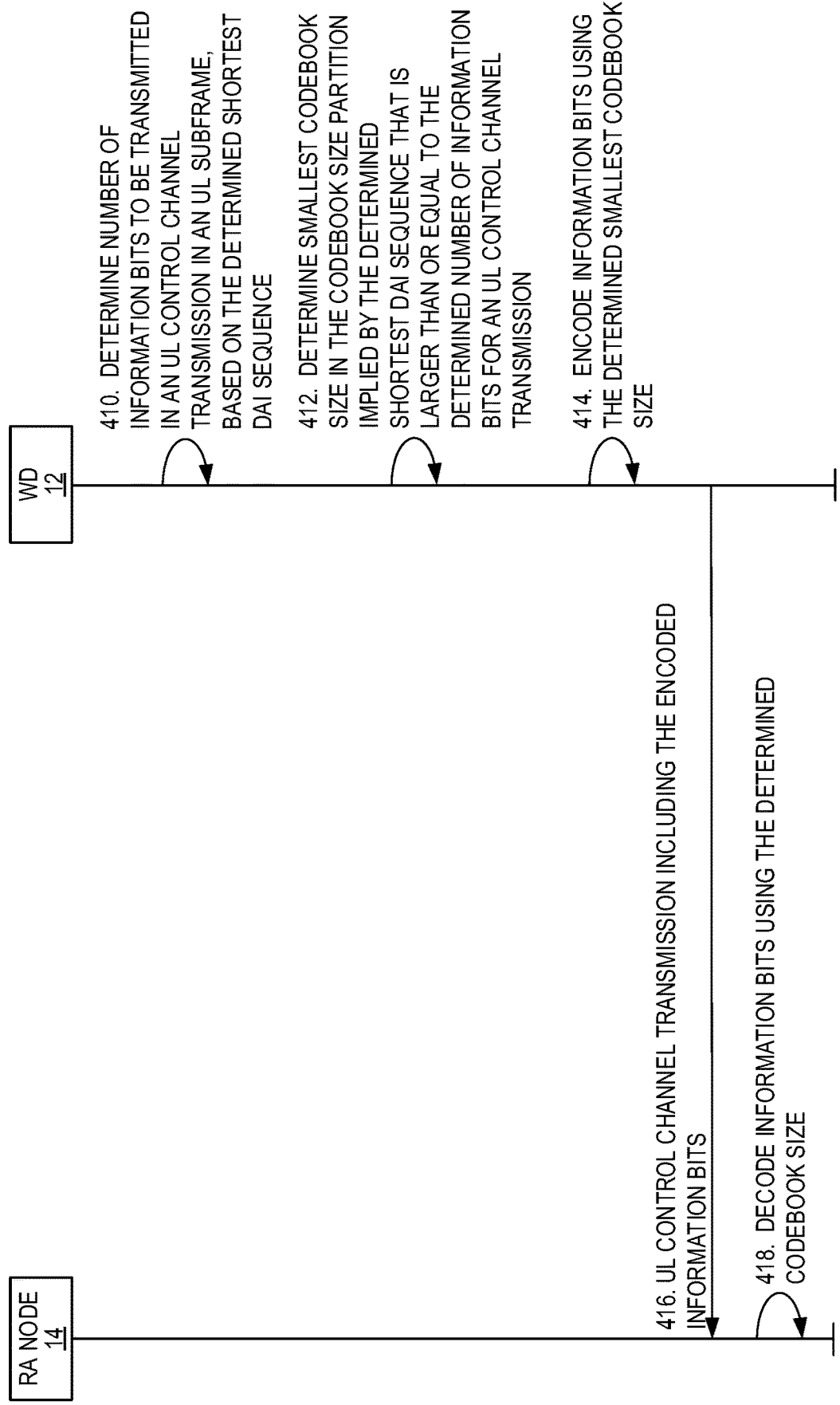

FIGS. 7A and 7B illustrate the operation of a radio access node 14 and a wireless communication device 12 according to one example of the embodiments relating to solution 3 described above and solution 4, which is described in more detail below. The following description is of FIGS. 7A and 7B as they relate to solution 3. A discussion of how FIGS. 7A and 7B relate to solution 4 will be provided below.

In general, there are multiple consecutive downlink subframes in the uplink/downlink configuration that are associated with the same uplink subframe. The radio access node 14 transmits downlink assignments to the wireless communication device 12 in two or more of the downlink subframes. In each downlink subframe, the radio access node 14 also provides an implicit indication of a codebook size partition that includes a codebook size needed for transmission of an accumulated number of information bits in the associated uplink subframe. The implicit indication is, in this embodiment, the DAI ordering used for the downlink assignments transmitted in the downlink subframe, where different DAI orderings are used for different codebook size partitions.

Looking at the example embodiment of FIGS. 7A and 7B, the radio access node 14 determines a codebook size to be used for a first number of information bits (e.g., HARQ feedback bits) for a uplink control channel (e.g., PUCCH) transmission in an uplink subframe in response to downlink assignments for a number of CCs in a first downlink subframe (step 400). In this example, the first downlink subframe is a downlink subframe in a number of consecutive downlink subframes in a TDD uplink/downlink configuration for the communication network 10. The multiple consecutive downlink subframes are associated with the same uplink subframe for purposes of transmission of uplink control channel information from the wireless communication device 12.

As an example, if the first downlink subframe includes downlink assignments for the wireless communication device 12 for M CCs and two information bits are to be transmitted by the wireless communication device 12 on a respective uplink control channel in the associated uplink subframe in response to the downlink assignments for the M CCs, then the radio access node 14 determines that there are 2×M information bits to be transmitted on the uplink control channel. The wireless communication device 12 then determines the codebook size from the predefined set of codebook sizes needed for transmission of the determined number of information bits (i.e., the smallest predefined codebook size in the predefined set of codebook sizes that is greater than or equal to the determined number of information bits). Again, the predefined set of codebook sizes is divided into a predefined number of disjoint subsets, or partitions. The determined codebook size belongs to only one of the partitions.

The radio access node 14 implicitly signals, to the wireless communication device 12, an indication of the predefined codebook size partition, or subset, in which the determined first codebook size included. More specifically, in this example, the radio access node 14 transmits a DCI message to the wireless communication device 12 in the first downlink subframe, where the DCI message includes at least one of the downlink assignments for the wireless communication device 12 and a DAI ordering used for the downlink assignments is that of the codebook size partition in which the first codebook size is included (step 402). Note that the DCI message may include all of the downlink assignments for the wireless communication device 12 that are to be transmitted in the second downlink subframe. Alternatively, the downlink assignments that are to be transmitted in the first downlink subframe may be transmitted in multiple DCI messages in the first downlink subframe. However, in this embodiment, the DAI ordering used for the downlink assignments transmitted to the wireless communication device 12 in the first downlink subframe all use the DAI ordering for the codebook size partition that includes the first codebook size.

The radio access node 14 also determines a codebook size to be used for an accumulated number of information bits (e.g., HARQ feedback bits) for the uplink control channel (e.g., PUCCH) transmission in the uplink subframe in response to downlink assignments for a number of CCs in the first downlink subframe and a second downlink subframe (step 404). As an example, if the first downlink subframe includes downlink assignments for the wireless communication device 12 for M1 CCs, the second downlink subframe includes downlink assignments for the wireless communication device 12 for M2 CCs, and two information bits are to be transmitted by the wireless communication device 12 on the uplink control channel in the associated uplink subframe for each downlink assignment, then the radio access node 14 determines that the accumulated number of information bits to be transmitted on the uplink control channel is 2×(M1+M2). Then, the wireless communication device 12 determines the information bit codebook size (i.e., the second codebook size) from the predefined set of codebook sizes needed for transmission of the determined accumulated number of information bits (i.e., the smallest predefined codebook size in the predefined set of codebook sizes that is greater than or equal to the determined accumulated number of information bits).

The radio access node 14 implicitly signals, to the wireless communication device 12, an indication of the predefined codebook size partition, or subset, in which the second codebook size included. More specifically, in this example, the radio access node 14 transmits a DCI message to the wireless communication device 12 in the second downlink subframe, where the DCI message includes at least one of the downlink assignments for the wireless communication device 12 and a DAI ordering used for the downlink assignments is that of the codebook size partition in which the second codebook size is included (step 406). Note that the DCI message may include all of the downlink assignments for the wireless communication device 12 that are to be transmitted in the second downlink subframe. Alternatively, the downlink assignments that are to be transmitted in the second downlink subframe may be transmitted in multiple DCI messages in the second downlink subframe.

However, in this embodiment, the DAI ordering used for the downlink assignments transmitted to the wireless communication device 12 in the second downlink subframe all use the DAI ordering for the codebook size partition that includes the second codebook size.

At the wireless communication device 12, upon receiving the downlink assignment(s) for the CC(s) in the first and second downlink subframes, the wireless communication device 12 determines the shortest DAI sequence, considering one or more different candidate DAI ordering sets for the downlink subframes, that is consistent with the received DAI sequence (step 408). As discussed above, due to missed downlink assignments, the received DAI sequence at the wireless communication device 12 may be different than the transmitted DAI sequence. The details for different ways to determine the shortest DAI sequence are provided above and, therefore, not repeated here.

Using the determined shortest DAI sequence, the wireless communication device 12 determines the number of information bits to be transmitted in an uplink control channel transmission in the associated uplink subframe (step 410). For example, assume that:

there are two downlink subframes, or Transmission Time Intervals (TTIs), for each uplink subframe and that each scheduled CC requires two information bits to be fed back in an uplink control channel transmission in the associated uplink subframe, the radio access node 14 transmits downlink assignments for four CCs to the wireless communication device 12 in the first downlink subframe and downlink assignments for three CCs to the wireless communication device 12 in the second downlink subframe where the respective CC logical indices are: 0, 1, 2, 3, 4, 5, and 6, the DAI ordering is a forward DAI ordering defined as DAI=mod(CC_logical_index, 4) for the codebook size partition {8, 24, 40, . . . } and a backward DAI ordering defined as DAI=3−mod(CC_logical_index, 4) for the codebook size partition {16, 32, 48, . . . } such that:

the transmitted DAI sequence for the first downlink subframe is (00, 01, 10, 11) since a codebook size of 8 is needed, and the transmitted DAI sequence for the second downlink subframe is (11, 10, 01) since a codebook size of 16 is needed since the accumulated number of information bits that are needed is 14.

Thus, in this example, the number of information bits expected by the radio access node 14 to be transmitted in the uplink control channel transmission by the wireless communication device 12 is fourteen (i.e., 7 CCs×2 information bits per CC=14 information bits). In the first downlink subframe, the first codebook size, which is 8, is in the first codebook size partition such that the first, or forward, DAI ordering is used. Conversely, in the second downlink subframe, the second codebook size needed for the accumulated number of information bits is 16 such that the second, or backward, DAI ordering is used. In other words, the forward DAI ordering is used in the first downlink subframe to implicitly signal the first codebook size partition, and the backward DAI ordering is used in the second downlink subframe to implicitly signal the second codebook size partition. At the wireless communication device 12, assume as an example that the wireless communication device 12 misses the DAI assignment for the CCs having the logical indices of 3 and 5 (i.e., misses the fourth downlink assignment in the first downlink subframe and the second downlink assignment in the second downlink subframe). Then, the received DAI sequence at the wireless communication device 12 will be: (00, 01, 10), (11, 01). By comparing the received DAI sequence to the predefined DAI sequences for the first and second codebook size partitions for a number of candidate DAI ordering sets (e.g., (F,F), (F,B), etc.), the wireless communication device 12 is able to identify the shortest DAI sequence that is consistent with the received DAI sequence, which is (00, 01, 10, 11), (11, 10, 01). Once the shortest sequence is known, the wireless communication device 12 determines the number of information bits to be transmitted in the uplink control channel as, in this example, 2 information bits per CC×7 CCs as indicated by the shortest DAI sequence=14 information bits.

Once the wireless communication device 12 has determined the number of information bits to be transmitted in the uplink control channel, the wireless communication device 12 determines the smallest codebook size in the most recently signaled codebook size partition that is greater than or equal to the determined number of information bits (step 412). Continuing the example above, the determined number of information bits is 10 and the codebook size partition signaled in the second downlink subframe is the second codebook size partition, i.e., {16, 32, 48, . . . }, as implicitly indicated by the backward DAI ordering in the second downlink subframe. As such, the wireless communication device 12 determines that the codebook size of 16 is the smallest codebook size that can be used. The wireless communication device 12 then encodes the determined number of information bits using the determined smallest codebook size in the explicitly signaled codebook size partition (step 414). Notably, predetermined bits are inserted for the missed downlink assignment (e.g., HARQ NACK bits are inserted for the CC that corresponds to the missed downlink assignment). Here, the information bits include, e.g., the HARQ ACK/NACK bits for the respective CCs, CSI bits, and/or SR or other bits used for system operation. The wireless communication device 12 then transmits an uplink control channel transmission including the encoded information bits (step 416).

At the radio access node 14, the radio access node 14 receives the uplink control channel transmission and decodes the encoded information bits using the codebook size determined in step 404 (step 418). Note that while the example of FIGS. 7A and 7B uses only two downlink subframes, there may be more downlink subframes depending on the uplink/downlink configuration.

3.4 Solution 4: DAI Ordering Depends on the Logical Index of the Scheduled CC and the Last DAI Index in the Previous Subframe 3.4.1 at the Radio Access Node Side In the first downlink subframe in a set of associated downlink subframes in which a wireless communication device 12 (e.g., UE) is scheduled, the DAI ordering is chosen according to solution 3 above. In a downlink subframe in which the DAI ordering, or equivalently the partition to which the codebook size belongs, changes, the DAI ordering is chosen as in solution 3, but an extra offset which depends on the DAI of the scheduled CC with the highest CC logical index in the last subframe is added to the DAI. This offset is added to all DAI until the DAI ordering changes again, which might occur in the next subframe, or even later. For example, using the same setup as the example in solution 3, let the two orderings used in the first downlink subframe be DAI=mod (CC logical index, 4) for the codebook size set {8, 24, 40, ... } and DAI=mod (3−CC logical index, 4) for the codebook size set {16, 32, 48, ... }.

In the second subframe, let the ordering be DAI=mod (f1(DAI_last)+CC logical index, 4) for the codebook size set {8, 24, 40, ... } and DAI=mod (f2(DAI_last)−CC logical index, 4) for the codebook size set {16, 32, 48, ... }. Here, DAI_last is the DAI associated with the last scheduled CC in the first subframe, and f1 and f2 are two functions from {0, 1, 2, 3} to {0, 1, 2, 3}. For example, the functions f1 and f2 could be f1(0)=0, f1(1)=1, f1(2)=2, and f1(3)=3, and f2(DAI_last)=f1(DAI_last).

In this example, assume that the radio access node 14 (e.g., eNB) schedules three CCs in TTI #1 and four CCs in TTI #2. The codebook size needed for the HARQ feedback scheduled in the first TTI would be 8, because there are six total feedback bits. Thus, the radio access node 14 uses the DAIs [00, 01, 10] in the first TTI. In the second TTI, there are four scheduled CCs bringing the total number of feedback bits up to 14, 6 from the first TTI and 8 from the second TTI. Thus the codebook size needed is 16 bits. Because 16 belongs to the second partition, the second DAI ordering is used. The last DAI index in the first subframe was 10, so the offset used is f2(10)=2. Thus, the DAIs used in the second TTI are [11, 10, 01, 00].

Note that if there were three downlink TTIs to be reported in the same uplink TTI, and the ordering does not change between the second and the third TTI, the same value for DAI_last would be used in TTI #2 and TTI #3, i.e. the DAI from the CC with the highest logical index scheduled in TTI #1.

This setup can of course be extended to more than 2 bits DAI, more than two partitions, and other orderings.

3.4.2 at Wireless Communication Device Side

The processing at the wireless communication device 12 side is very similar to that described above for solution 3, the only difference is when finding sequences consistent with the received sequence.

3.4.3 System Operation for Solution 4

FIGS. 7A and 7B illustrate the operation of a radio access node 14 and a wireless communication device 12 according to one example of the embodiments relating to solution 4 described above. The following description is of FIGS. 7A and 7B as they relate to solution 4. As description of FIGS. 7A and 7B as they relate to solution 3 was given above.

Here, the process of FIGS. 7A and 7B as it relates to solution 4 is the same as that described above for solution 3 but where the DAI ordering in the second downlink subframe is also a function of the DAI of the scheduled CC with the highest CC logical index in the last subframe, i.e., an extra offset which depends on the DAI of the scheduled CC with the highest CC logical index in the last subframe is added to the DAI. Specifically, the radio access node 14 determines a codebook size to be used for a first number of information bits (e.g., HARQ feedback bits) for a uplink control channel (e.g., PUCCH) transmission in an uplink subframe in response to downlink assignments for a number of CCs in a first downlink subframe (step 400). The radio access node 14 transmits a DCI message to the wireless device 12 in the first downlink subframe, where the DCI message includes at least one of the downlink assignments for the wireless communication device 12 and a DAI ordering used for the downlink assignments is that of the codebook size partition in which the first codebook size is included (step 402). Note that the DCI message may include all of the downlink assignments for the wireless communication device 12 that are to be transmitted in the second downlink subframe. Alternatively, the downlink assignments that are to be transmitted in the first downlink subframe may be transmitted in multiple DCI messages in the first downlink subframe. However, in this embodiment, the DAI ordering used for the downlink assignments transmitted to the wireless communication device 12 in the first downlink subframe all use the DAI ordering for the codebook size partition that includes the first codebook size.

The radio access node 14 also determines a codebook size to be used for an accumulated number of information bits (e.g., HARQ feedback bits) for the uplink control channel (e.g., PUCCH) transmission in the uplink subframe in response to downlink assignments for a number of CCs in the first downlink subframe and a second downlink subframe (step 404). The radio access node 14 transmits a DCI message to the wireless communication device 12 in the second downlink subframe, where the DCI message includes at least one of the downlink assignments for the wireless communication device 12 and a DAI ordering used for the downlink assignments is that of the codebook size partition in which the second codebook size is included (step 406). Here, the DAI ordering used in the second downlink subframe is a function of the highest logical CC index from among the downlink assignments transmitted to the wireless communication device 12 in the first downlink subframe. Note that the DCI message may include all of the downlink assignments for the wireless communication device 12 that are to be transmitted in the second downlink subframe. Alternatively, the downlink assignments that are to be transmitted in the second downlink subframe may be transmitted in multiple DCI messages in the second downlink subframe. However, in this embodiment, the DAI ordering used for the downlink assignments transmitted to the wireless communication device 12 in the second downlink subframe all use the DAI ordering for the codebook size partition that includes the second codebook size, including the offset that depends on the DAI of the scheduled CC with the highest CC logical index in the first downlink subframe.

At the wireless communication device 12, upon receiving the downlink assignment(s) for the CC(s) in the first and second downlink subframes, the wireless communication device 12 determines the shortest DAI sequence, considering one or more different candidate DAI ordering sets for the downlink subframes, that is consistent with the received DAI sequence (step 408). Using the determined shortest DAI sequence, the wireless communication device 12 determines the number of information bits to be transmitted in an uplink control channel transmission in the associated uplink subframe (step 410).

Once the wireless communication device 12 has determined the number of information bits to be transmitted in the uplink control channel, the wireless communication device 12 determines the smallest codebook size in the most recently signaled codebook size partition that is greater than or equal to the determined number of information bits (step 412). The wireless communication device 12 then encodes the determined number of information bits using the determined smallest codebook size in the explicitly signaled codebook size partition (step 414). Notably, predetermined bits are inserted for the missed downlink assignment (e.g., HARQ NACK bits are inserted for the CC that corresponds to the missed downlink assignment). Here, the information bits include, e.g., the HARQ ACK/NACK bits for the respective CCs, CSI bits, and/or SR or other bits used for system operation. The wireless communication device 12 then transmits an uplink control channel transmission including the encoded information bits (step 416).

At the radio access node 14, the radio access node 14 receives the uplink control channel transmission and decodes the encoded information bits using the codebook size determined in step 404 (step 418). Note that while the example of FIGS. 7A and 7B uses only two downlink subframes, there may be more downlink subframes depending on the uplink/downlink configuration.

3.5 Additional Examples

Figure 8:
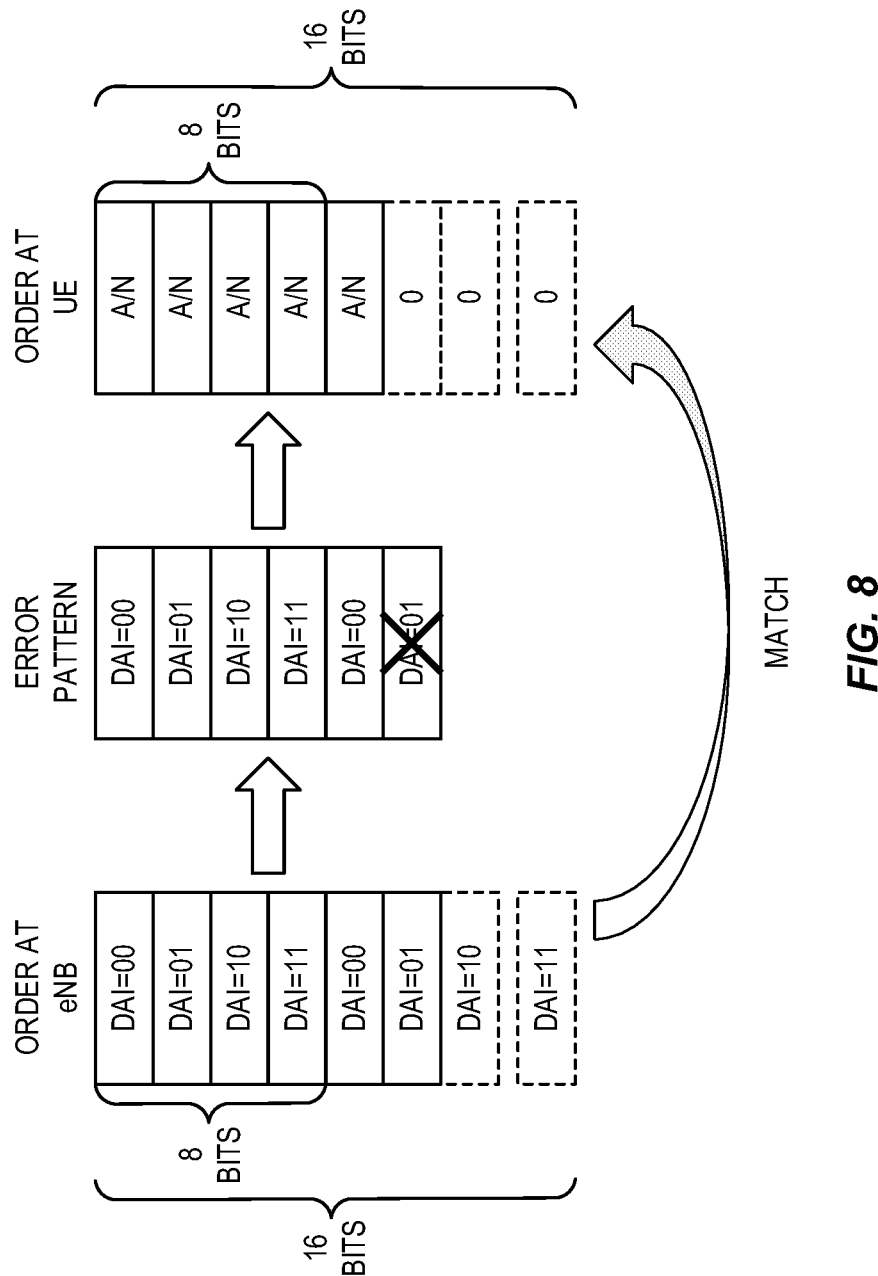
FIGS. 8 through 11 illustrate some additional examples that are particularly focused on a Frequency Division Duplexing (FDD) scenario.
Figure 9:
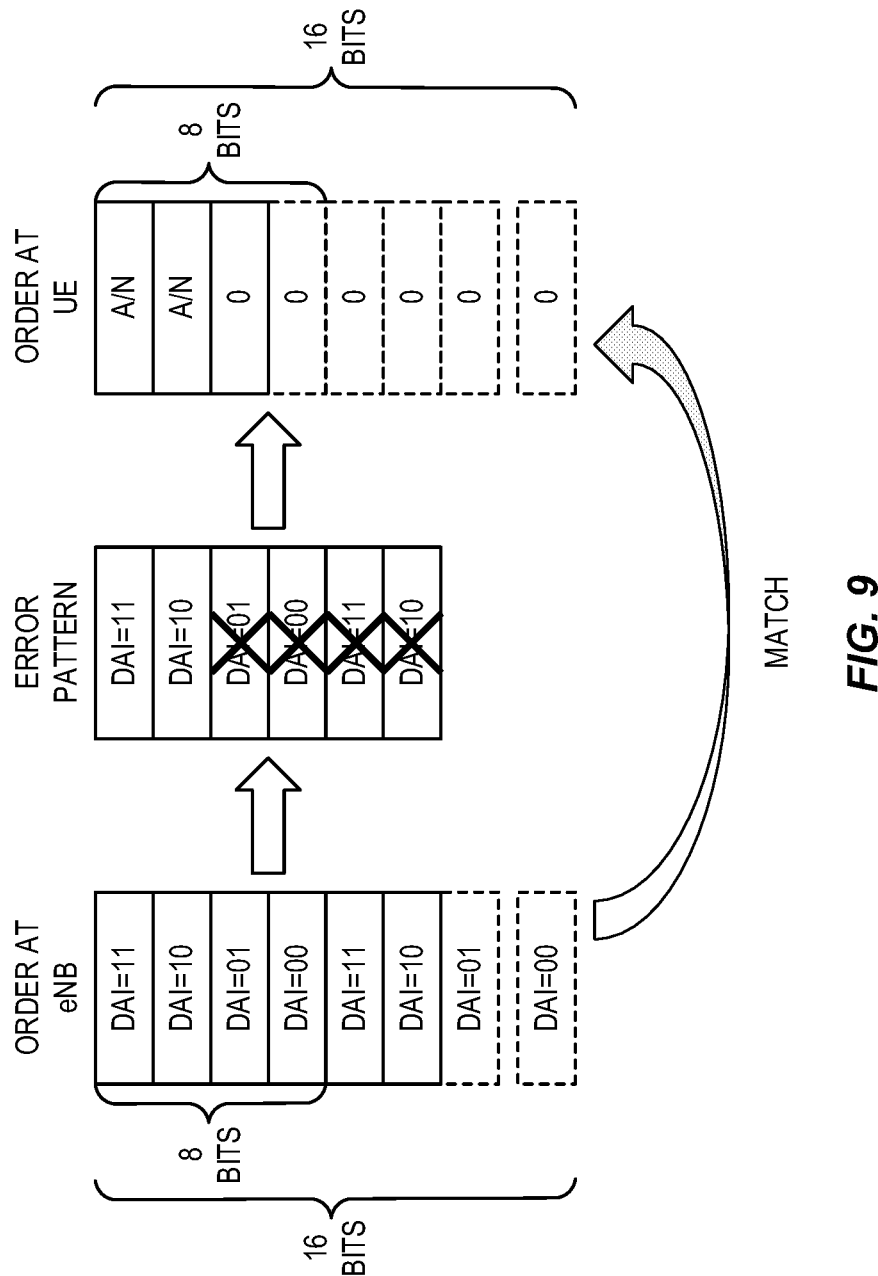
Figure 10:
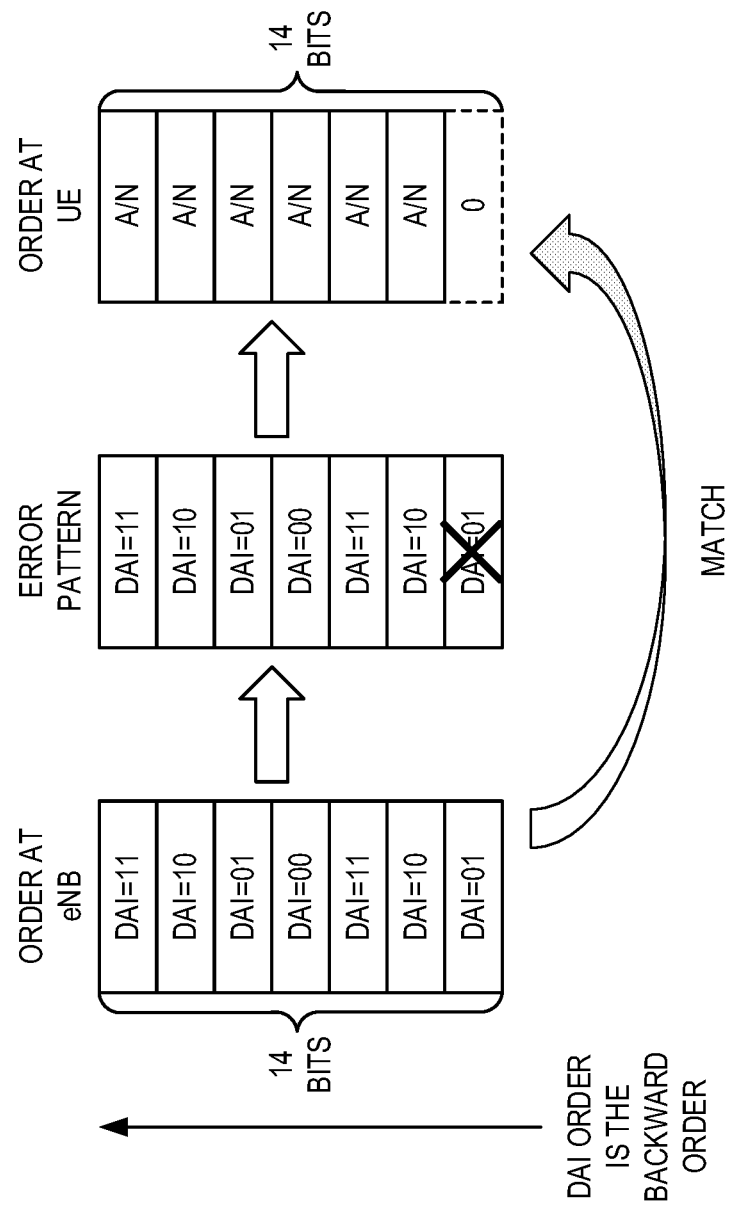
Figure 11:
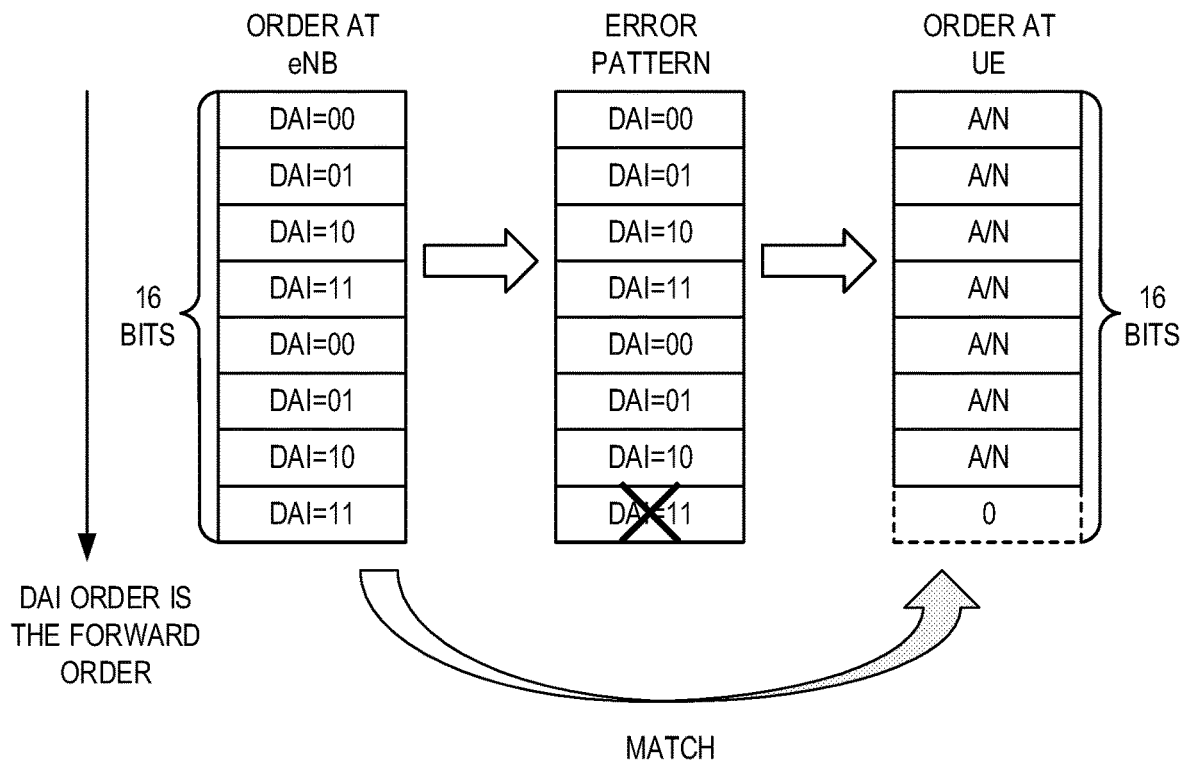

FIGS. 8 through 11 illustrate some additional examples that are particularly focused on a FDD scenario. FIG. 8 illustrates an example in which there are two codebook size partitions, namely, a first partition that includes codebook sizes {8, 24, 40, . . . } and a second partition that includes codebook sizes {16, 32, 48, . . . }. In this example, the codebook size partition to use for feedback is explicitly signaled to the wireless communication device 12. Further, in this example, the last DAI is missed at the wireless communication device 12. However, because the wireless communication device 12 receives the explicit indication to use the second codebook size partition, the wireless communication device 12 knows to use 16 bits for feedback. FIG. 9 illustrate a similar example but where the wireless communication device 12 misses the last four DAIs; however, the wireless communication device 12 still knows to feedback 16 bits since it has received an explicit indication to use the second codebook size partition. FIGS. 10 and 11 illustrate examples similar to that of FIG. 8 but where the codebook size partition is implicitly signaled via the ordering of the transmitted DAI sequence. In FIG. 10, the backward DAI ordering is utilized to implicitly signal the second codebook size partition, whereas the forward DAI ordering would be utilized to implicitly indicate the first codebook size partition. Conversely, in FIG. 11, the forward DAI ordering is utilized to implicitly signal the second codebook size partition, whereas the backward DAI ordering would be utilized to implicitly indicate the first codebook size partition.

Figure 12:
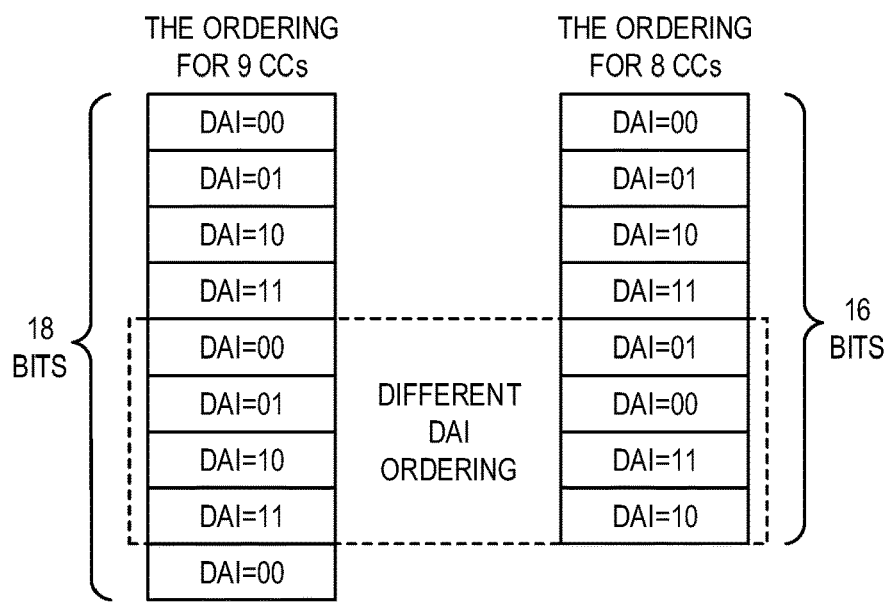
FIG. 12 illustrates an example in which two different DAI sequences utilized to implicitly indicate codebook size partition are partially the same.

FIG. 12 illustrates yet another example in which the first DAI sequence use to indicate the first codebook size partition is:

$$DAI = \begin{cases} \mod(CC \text{ logical index}, 4) & \text{if } CC \text{ logical index} < L_{scheduled} - 4 \\ 3 - \mod(CC \text{ logical index} + 2, 4) & \text{if } CC \text{ logical index} \geq L_{scheduled} - 4 \end{cases}$$

and the second DAI sequence used to indicate the second codebook size partition is:

DAI=mod(CC logical index,4).

Thus, in other words, FIG. 12 illustrates one example in which the ordering for the DAI sequences for implicitly indicating either the first or second codebook size partition are only partially different. This may be used for any of the embodiments described herein.

3.6 Discussion of Certain Aspects of the Present Disclosure

The following discussion relates to 3GPP LTE and the application of certain aspects of the present disclosure to 3GPP LTE.

3.6.1 Introduction

HARQ-ACK codebook adaptation for Release (Rel) 13 Carrier Aggregation (CA) was discussed at RAN1#82 and the following agreements were made HARQ-ACK codebook size is dynamically determined
To ensure same understanding between the eNB and the UE regarding the HARQ-ACK codebook (including HARQ-ACK order and size)
For further study, eNB transmits signaling in downlink assignment:
For further study: Detailed signaling, e.g.,
Counter DAI only
For further study: Whether DAI can be not consecutive
A Counter DAI and a Total DAI
Combined DAI carrying either Counter or Total, based on the order of scheduling
HARQ-ACK codebook indicator to indicate the possible carriers
Note: Other alternatives are not precluded
For further study: Additional uplink signaling to indicate HARQ ACK codebook size
For further study: PUCCH format adaptation
In this discussion, views on HARQ-ACK codebook adaptation for Rel-13 CA enhancement are described.

3.6.2 Discussion

3.6.2.1 HARQ-ACK Codebook Adaptation

Dynamic HARQ-ACK codebook adaptation was agreed at RAN1#82. In order to ensure the HARQ-ACK codebook alignment between the eNB and the UE, the existing DAI schemes are enhanced with the introduction of counter DAI and/or total DAI (Intel Corporation, "R1-152625: HARQ-ACK feedback for CA with up to 32 CCs," 3GPP TSG-RAN WG1#81, May 25-29, 2015; Huawei et al., "R1-153771: HARQ-ACK Codebook determination for carrier aggregation enhancement beyond 5 carriers," 3GPP TSG RAN WG1 Meeting #82, Aug. 24-28, 2015; Lenovo, "R1-154503: HARQ-ACK codebook determination for Rel-13 eCA," 3GPP TSG RAN WG1 Meeting #82, Aug. 24-28, 2015; Samsung, "R1-154117: Discussion on HARQ-ACK codebook determination for eCA," 3GPP TSG RAN WG1#82, Aug. 24-28, 2015. In Ericsson, "R1-154420: HARQ-ACK transmission for Rel-13 CA enhancement," 3GPP TSG RAN WG1 Meeting #82, Aug. 24-28, 2015, a compromised solution was also between slow and fast codebook adaptation. In particular, a set of HARQ-ACK codebook sizes is predefined. The HARQ-ACK codebook size can only be selected from this predefined set, e.g., {22, 32, 40, 48, 56, . . . , 128}. At the UE, the HARQ-ACK codebook size is selected as the minimum value from the predefined set which is larger than the feedback bits determined by the scheduled CCs detected at the UE. This description provides a proposal by which the HARQ-ACK codebook ambiguity problem can be mitigated. One problem is that the mismatch still happens when the number of scheduled carriers is close to the predefined codebook sizes. Essentially there is trade-off between the flexibility of HARQ-ACK codebook adaptation and the probability of HARQ-ACK codebook mismatch. With a large number of HARQ-ACK codebook size, the HARQ-ACK codebook size can be adapted more dynamically while the probability of mismatch also increases. On the contrary, the HARQ-ACK codebook size can only be selected from a few candidate values while the probability of mismatch also decreases.

Figure 13:
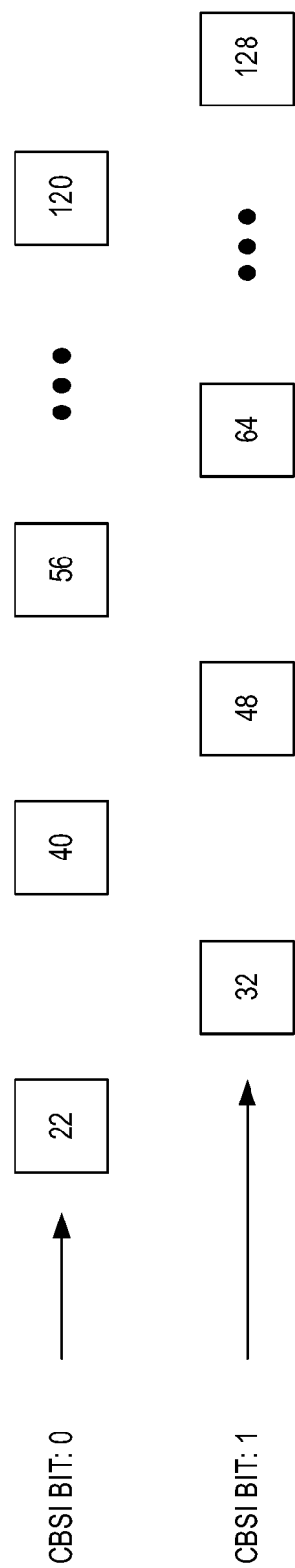
FIG. 13 illustrates an example mapping between Codebook Size Indicator (CBSI) bit values and predefined Hybrid Automatic Repeat Request (HARQ) Acknowledgement (ACK) codebook size subsets.

One way to avoid the mismatch above when the number of scheduled carriers is close to the predefined codebook sizes is to divide the set of HARQ-ACK codebook sizes into two subsets and signal to which subset the codebook size belongs to through an extra Codebook Size Indicator (CBSI) bit in the DCI. This makes the codebook size mismatch due to missed detection of (enhanced) PDCCH ((E-)PDCCH) assignments very small. As an example shown in FIG. 13 which illustrates a mapping between CBSI bit values and predefined HARQ-ACK codebook size subsets, assume that the CBSI is set to 0 if the number of bits to be reported is in the subset {22, 40, 56, . . . , 120} and the CBSI is set to 1 if the number of bits to be reported is in the subset {32, 48, 64, . . . , 128}. Assume that the number of bits to be reported is 40, and the CBSI is hence set to 0. The only way that the UE miss detects the codebook size is for the UE to believe that the correct codebook size is 22, which requires the UE to miss detect (E)PDCCH assignments corresponding to at least 9 HARQ-ACK bits. If the UE detects (E)PDCCH assignments for between 23 and 32 bits, it knows from the CBSI in the DCI to report 40 bits instead of 32 bits.

Figure 17:
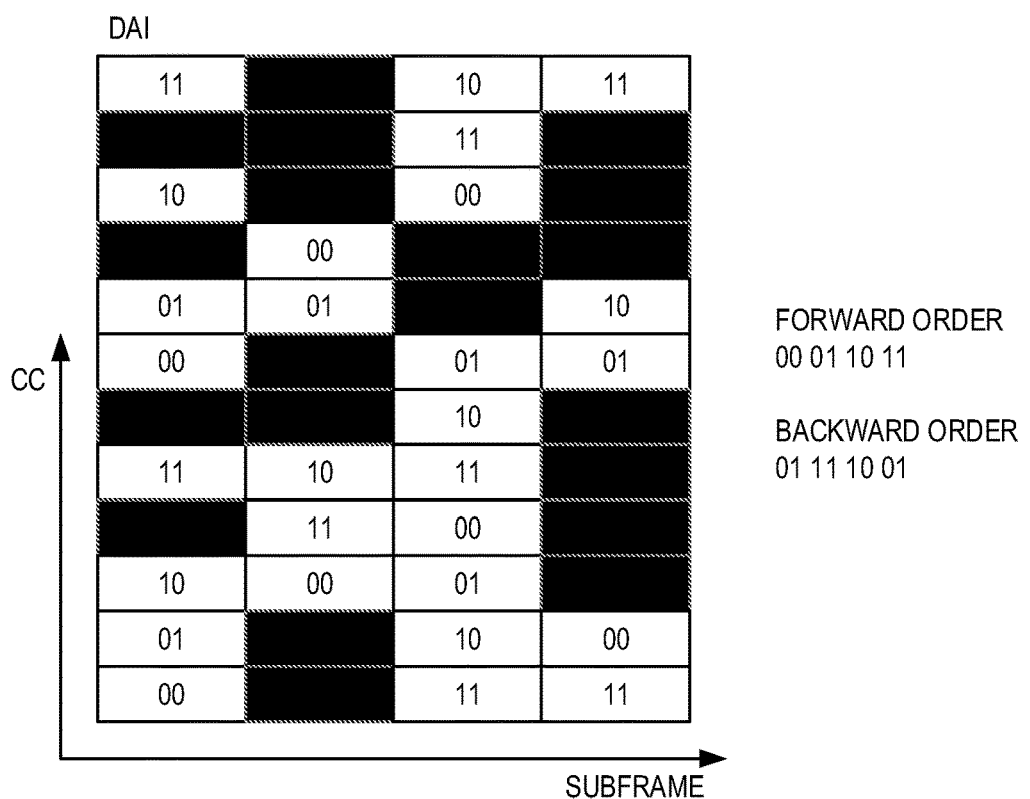
FIG. 17 illustrates another example of codebook size signaling through DAI ordering for TDD.

In case of TDD operation, the eNB accumulates the number of HARQ-ACK bits up to and including the current subframe and sets the CBSI as if the current subframe is the last subframe in which the UE is scheduled. An example is shown in FIG. 17, which illustrates DAI and CBSI bit for TDD. Here, it is assumed that each scheduled CC requires two HARQ-ACK bits, and dark CCs denote unscheduled CCs. In the first subframe, 8 CCs are scheduled, requiring 16 HARQ-ACK bits, so the codebook of size 22 is chosen which is indicated by setting the CBSI to 0. In the second subframe, five CCs are scheduled which makes the total number of HARQ-bits 26. Thus, the codebook of size 32 is chosen and the CBSI is set to 1. The same principle is applied in the third and fourth subframe.

Instead of signaling which subset the codebook size belongs to through a bit in the DCI field, each subset can be can be mapped to a specific DAI ordering. As one example shown in FIG. 18, the ascending DAI order is used if the number of bits to be reported is in the subset {22, 40, 56, . . . , 120} and the descending DAI order is used if the number of bits to be reported is in the subset {32, 48, 64, . . . , 128}. At the UE side, the UE first tries to determine which ordering was used, and then determine the codebook size. With this solution, the UE essentially chooses the codebook size from a smaller set, hence the probability of codebook size mismatch is much smaller than the original proposal. At the same time, the flexibility of codebook adaptation can still be maintained given that the number of predefined HARQ-ACK codebook sizes does not change.

Figure 14:
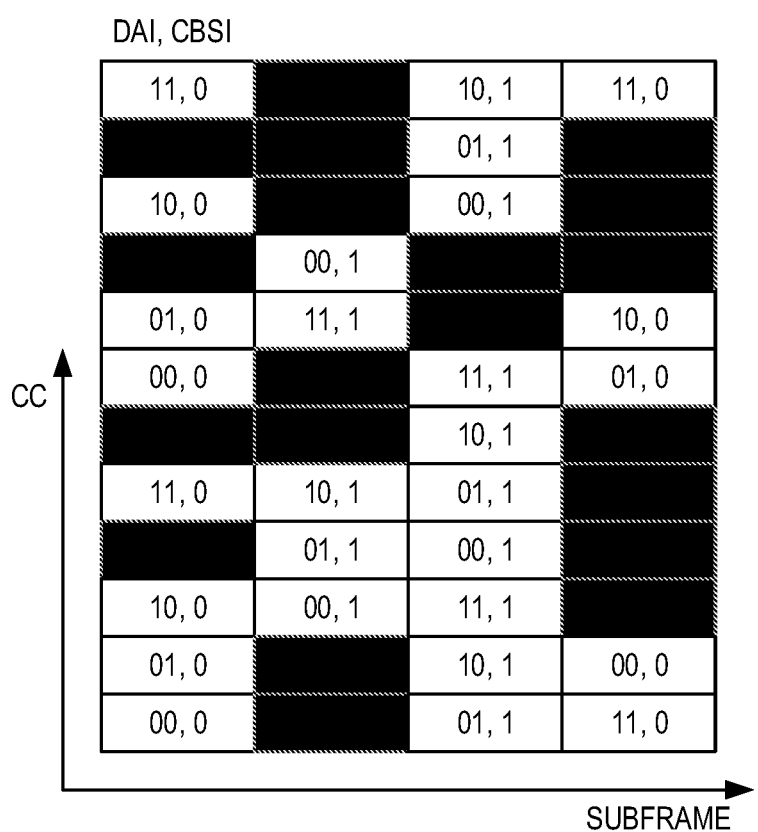
FIG. 14 illustrates an example DAI and CBSI bit for Time Division Duplexing (TDD)
Figure 15:
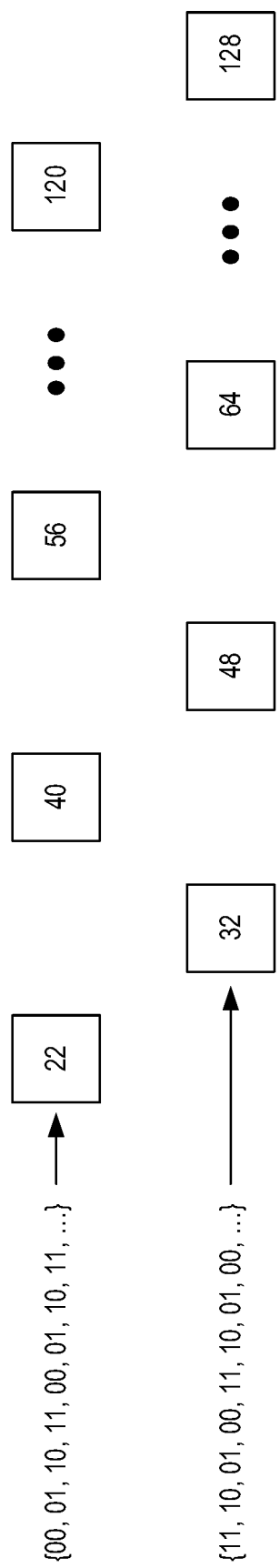
FIG. 15 illustrates an example mapping between DAI ordering and predefined HARQ-ACK codebook size subsets.

The DAI ordering can also be used instead of the CBSI bit in TDD operation. In this case, the DAI ordering varies between different subframes based on the accumulated number of HARQ-ACK bits. The same example as in FIG. 14 using DAI ordering instead of CBSI bit, and using the DAI ordering mapping from FIG. 15 is shown in FIG. 16.

Figure 16:
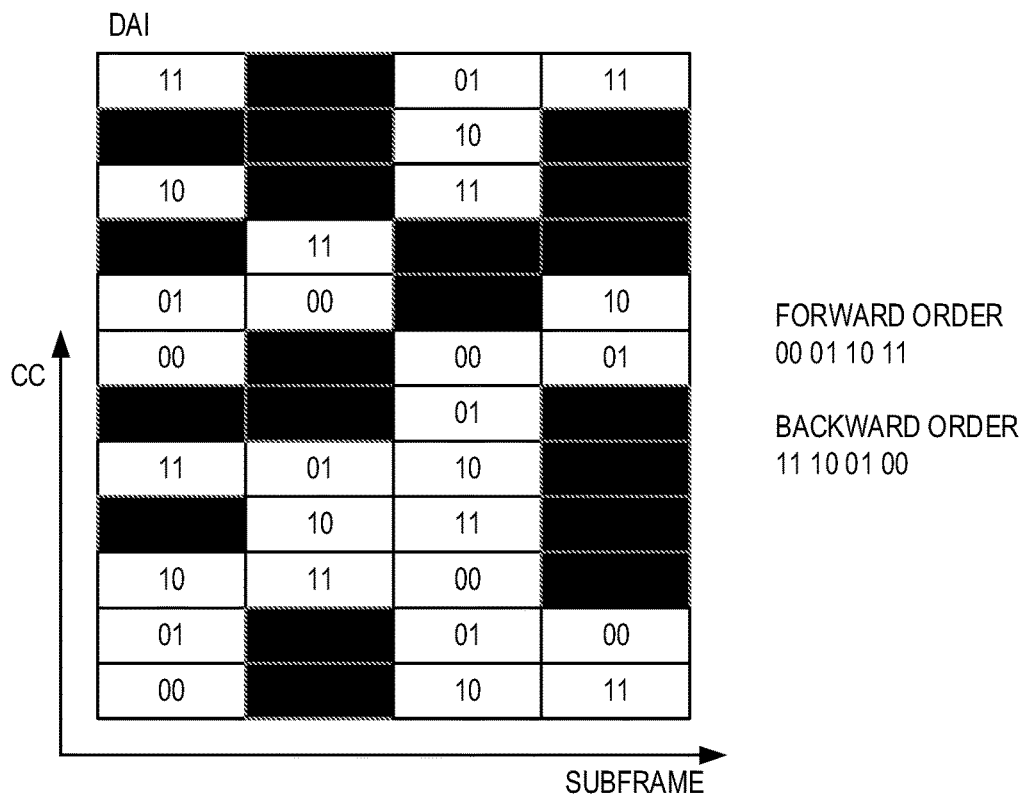
FIG. 16 illustrates codebook size signaling through DAI ordering for TDD.

In FIG. 16, the sequence with forward ordering is 00 01 10 11 and the sequence with backward ordering is 11 10 01 00. In FIG. 17, the sequence with forward ordering is 00 01 10 11 and the sequence with backward ordering is 00 11 10 01.

Another alternative to solve the HARQ-ACK misalignment is to signal the HARQ-ACK codebook size from the UE to the eNB. For example, in case the HARQ-ACK feedback is transmitted on PUCCH, the HARQ-ACK codebook size can be implicitly indicated by the cyclic shift of PUCCH Demodulation Reference Signal (DMRS). It should be noted that the cyclic shift may not cover all possible HARQ-ACK codebook sizes hence the mapping between the HARQ-ACK codebook size and Cyclic Shift may not be one-to-one. In another example, when the extended DAI scheme is applied for fast codebook adaptation, the UE could determine the PUCCH DMRS CS based on DAI value of the last received downlink DCI. At the eNB, it could first determine HARQ-ACK codebook size by detecting the cyclic shift of PUCCH DMRS then perform PUCCH detection.

Proposal:
One or several sets of HARQ-ACK codebook sizes are predefined.
The HARQ-ACK codebook size is selected from a set of predefined codebook sizes.
The set of predefined codebook sizes is either explicitly signaled by a CBSI bit in the DCI or implicitly indicated by the DAI ordering.

Figure 18:
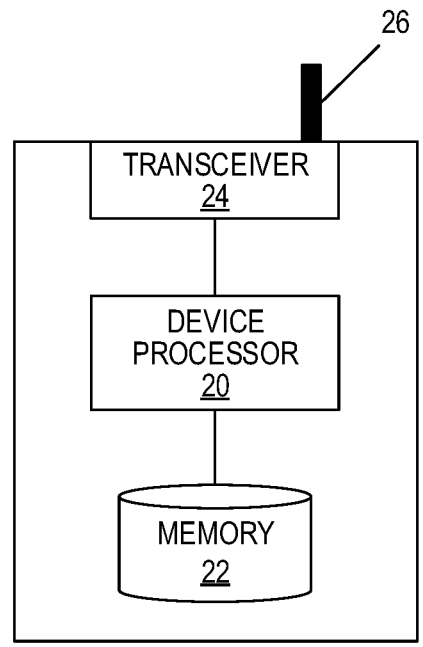
FIGS. 18 and 19 illustrate example embodiments of a wireless communication device.
Figure 19:
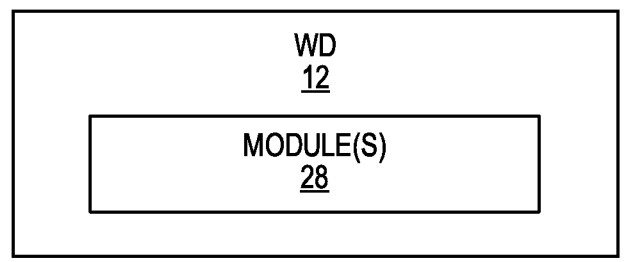
Figure 22:
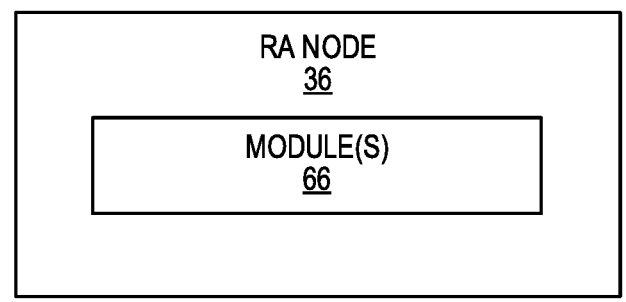

3.7 Example Embodiments of a Wireless Communication Device and a Radio Access Node Although wireless communication devices 12 may represent communication devices that include any suitable combination of hardware and/or software, these wireless communication devices may, in certain embodiments, represent devices such as an example wireless communication device illustrated in greater detail by FIGS. 18 and 19. Similarly, although the illustrated radio access node 14 may represent network nodes that include any suitable combination of hardware and/or software, these nodes may, in particular embodiments, represent devices such as the example radio access node illustrated in greater detail by FIGS. 20 through 22.

Referring to FIG. 18, a wireless communication device 12 comprises a processor 20, a memory 22, a transceiver 24, and an antenna 26. As will be appreciated by one of skill in the art, the processor 20 includes one or more hardware processors such as, for example, one or Central Processing Unit (CPUs) or other microprocessors, one or more Application Specific Integrated Circuit (ASICs), one or more Field Programmable Gate Array (FPGAs), and/or the like. In certain embodiments, some or all of the functionality described as being provided by the wireless communication device 12, UEs, MTC or M2M devices, and/or any other types of wireless communication devices may be provided by the processor 20 executing instructions stored on a computer-readable medium, such as the memory 22 shown in FIG. 18. Alternative embodiments may include additional components beyond those shown in FIG. 18 that may be responsible for providing certain aspects of the device's functionality, including any of the functionality described herein.

FIG. 19 illustrates the wireless communication device 12 according to some other embodiments of the present disclosure. As illustrated, the wireless communication device 12 includes one or more modules 28, each of which is implemented in software. The modules 28 may include, for example, a receiving module 28 operable to receive, from a cellular communications network, an indication of one of a plurality of predefined sets of feedback information codebook sizes, the plurality of predefined sets of feedback information codebook sizes being disjoint subsets of a plurality of predefined feedback information codebook sizes. As discussed above, the indication may be an explicit indication or an implicit indication. The modules 28 may include one or more additional modules operable to provide the functionality of the wireless communication device 12 according to any of the embodiments described above.

In some embodiments, a computer program including instructions which, when executed by at least one processor, causes the at least one processor to carry out the functionality of the wireless communication device 12 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 20:
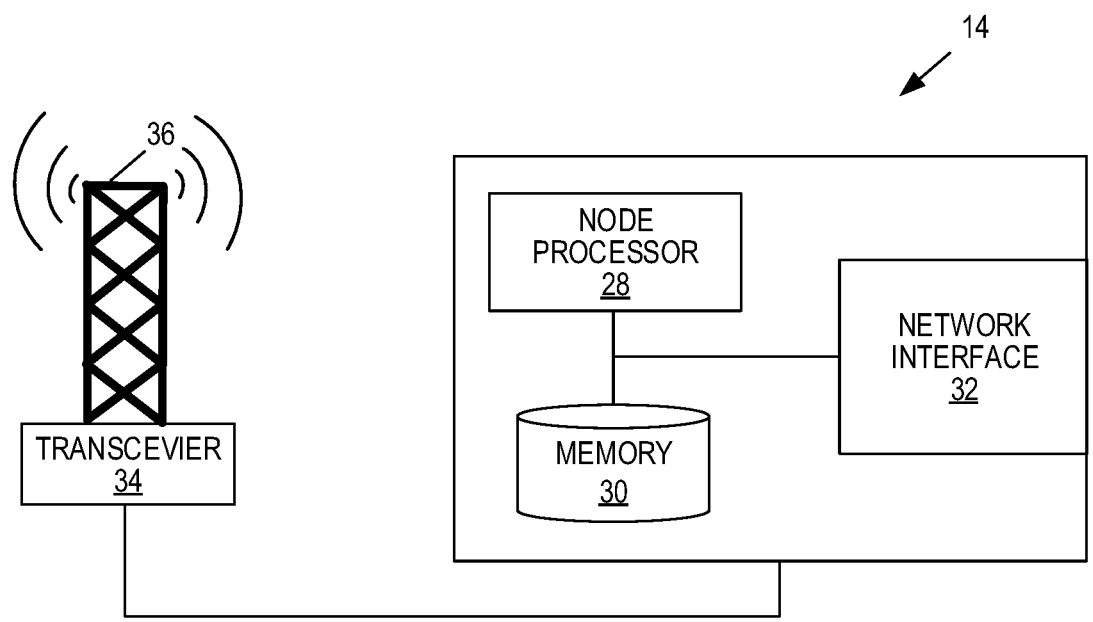
FIGS. 20 through 22 illustrate example embodiments of a radio access node.

Referring to FIG. 20, a radio access node 14 comprises a node processor 28, a memory 30, a network interface 32, a transceiver 34, and an antenna 36. As will be appreciated by one of skill in the art, the processor 28 includes one or more hardware processors such as, for example, one or CPUs or other microprocessors, one or more ASICs, one or more FPGAs, and/or the like. In certain embodiments, some or all of the functionality described as being provided by a base station, a node B, an eNB, and/or any other type of network node may be provided by the node processor 28 executing instructions stored on a computer-readable medium, such as the memory 30 shown in FIG. 20. Alternative embodiments of the radio access node 14 may comprise additional components to provide additional functionality, such as the functionality described herein and/or related supporting functionality.

Figure 21:
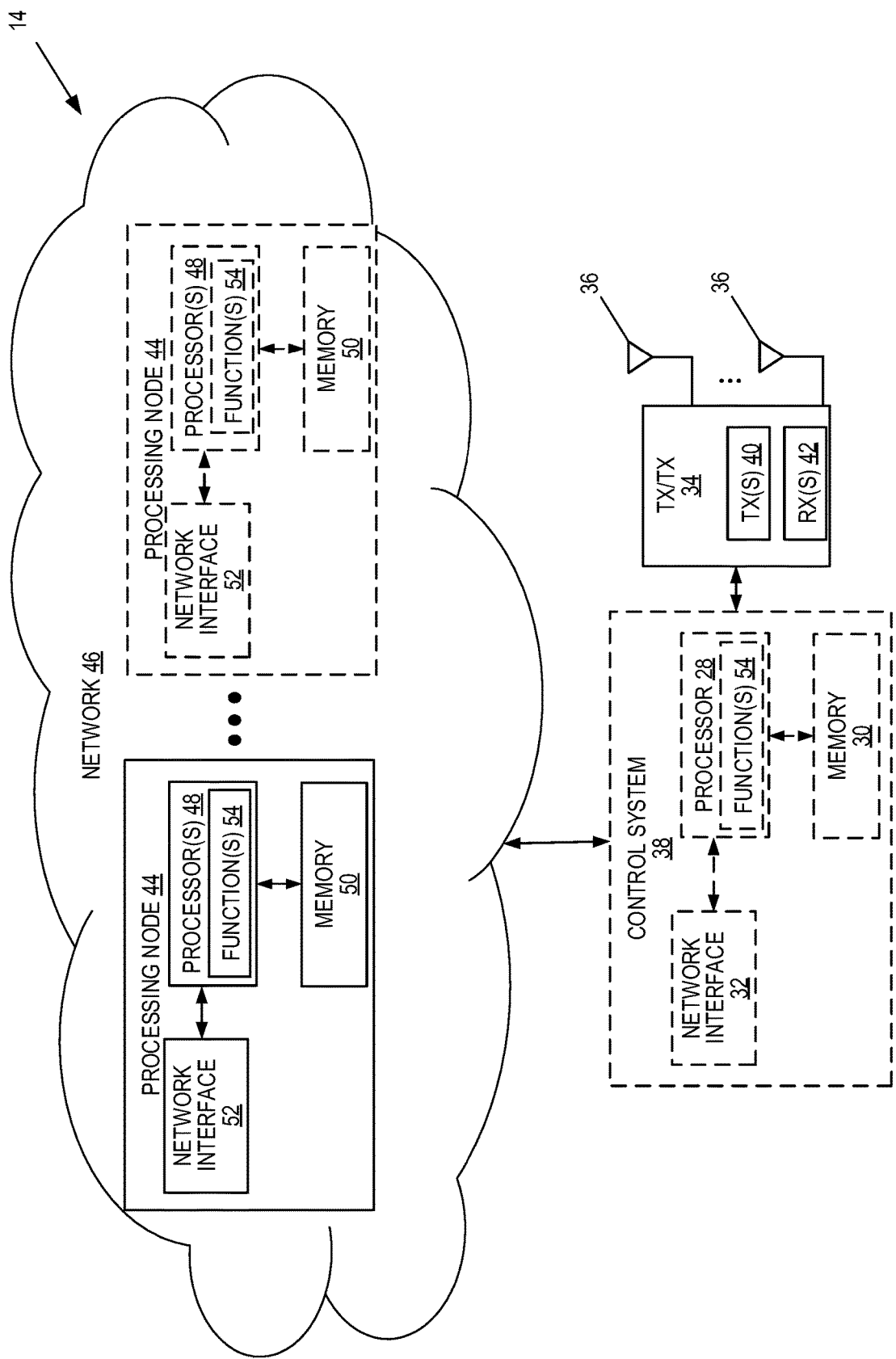

FIG. 21 is a schematic block diagram that illustrates a virtualized embodiment of the radio access node 14 according to some embodiments of the present disclosure. This discussion is equally applicable to other types of network nodes. Further, other types of network nodes may have similar virtualized architectures. As used herein, a "virtualized" radio access node 14 is an implementation of the radio access node 14 in which at least a portion of the functionality of the radio access node 14 is implemented as a virtual component(s) (e.g., via a virtual machine(s) executing on a physical processing node(s) in a network(s)). As illustrated, in this example, the radio access node 14 includes a control system 30 (optional) that includes the node processor 28 (e.g., CPUs, ASICs, FPGAs, and/or the like), the memory 30, and the network interface 32 and the transceiver 34 that includes one or more transmitters 40 and one or more receivers 42 coupled to the one or more antennas 36, as described above. The control system 38 is connected to the transceiver 34 via, for example, an optical cable or the like. The control system 38 is connected to one or more processing nodes 44 coupled to or included as part of a network(s) 46 via the network interface 32. Each processing node 44 includes one or more processors 48 (e.g., CPUs, ASICs, FPGAs, and/or the like), memory 50, and a network interface 52.

In this example, functions 54 of the radio access node 14 described herein are implemented at the one or more processing nodes 44 or distributed across the control system 38 and the one or more processing nodes 44 in any desired manner. In some particular embodiments, some or all of the functions 54 of the radio access node 14 described herein are implemented as virtual components executed by one or more virtual machines implemented in a virtual environment(s) hosted by the processing node(s) 44. As will be appreciated by one of ordinary skill in the art, additional signaling or communication between the processing node(s) 44 and the control system 38 is used in order to carry out at least some of the desired functions 54. Notably, in some embodiments, the control system 38 may not be included, in which case the transceiver 34 communicates directly with the processing node(s) 44 via an appropriate network interface(s).

In some embodiments, a computer program including instructions which, when executed by at least one processor, causes the at least one processor to carry out the functionality of a radio access node 14 or a node (e.g., a processing node 44) implementing one or more of the functions 54 of the radio access node 14 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 25 illustrates the radio access node 14 according to some other embodiments of the present disclosure. As illustrated, the radio access node 14 includes one or more modules 66, each of which is implemented in software. The modules 66 may include, for example, a providing module 66 operable to provide, to a wireless communication device 12, an indication of one of a plurality of predefined sets of feedback information codebook sizes, the plurality of predefined sets of feedback information codebook sizes being disjoint subsets of a plurality of predefined feedback information codebook sizes. As discussed above, the indication may be an explicit indication or an implicit indication. The modules 66 may include one or more additional modules operable to provide the functionality of the radio access node 14 according to any of the embodiments described above.

While the disclosed subject matter has been presented above with reference to various embodiments, it will be understood that various changes in form and details may be made to the described embodiments without departing from the overall scope of the disclosure.

The following acronyms are used throughout this disclosure.

3GPP Third Generation Partnership Project
ACK Acknowledgement
ASIC Application Specific Integrated Circuit
CA Carrier Aggregation
CBSI Codebook Size Indicator
CC Component Carrier
CPU Central Processing Unit
CRC Cyclic Redundancy Check
CSI Channel State Information
DAI Downlink Assignment Index
DCI Downlink Control Information
DMRS Demodulation Reference Signal
eNB Enhanced or Evolved Node B
E-PDCCH Enhanced Physical Downlink Control Channel
FDD Frequency Division Duplexing
FeCA Further Enhancement Carrier Aggregation
FPGA Field Programmable Gate Array
GHz Gigahertz
HARQ Hybrid Automatic Repeat Request
IEEE Institute of Electrical and Electronics Engineers
LAA License Assisted Access
LTE Long Term Evolution
M2M Machine-to-Machine
MHz Megahertz
MTC Machine Type Communication
NACK Negative Acknowledgement
PDCCH Physical Downlink Control Channel
PUCCH Physical Uplink Control Channel PUSCH Physical Uplink Shared Channel
RAN Radio Access Network
Rel Release
SR Scheduling Request
TDD Time Division Duplexing
TTI Transmission Time Interval
UCI Uplink Control Information
UE User Equipment
WLAN Wireless Local Area Network Those skilled in the art will recognize improvements and modifications to the embodiments of the present disclosure. All such improvements and modifications are considered within the scope of the concepts disclosed herein.

What is claimed is:

1. A method of operation of a wireless device in a cellular communications network, comprising:
receiving, from the cellular communications network, an indication of one of a plurality of predefined sets of feedback information codebook sizes, the plurality of predefined sets of feedback information codebook sizes being disjoint subsets of a plurality of predefined feedback information codebook sizes; and
receiving, from the cellular communications network, a plurality of downlink assignments for a plurality of component carriers;
wherein:
receiving the indication of the one of the plurality of predefined sets of feedback information codebook sizes comprises receiving one or more indications of one or more sets of feedback information codebook sizes from among the plurality of predefined sets of feedback information codebook sizes;
the one or more indications comprise a first explicit indication of a first set of feedback information codebook sizes from among the plurality of predefined sets of feedback information codebook sizes and a second explicit indication of a second set of feedback information codebook sizes from among the plurality of predefined sets of feedback information codebook sizes;
receiving the one or more indications comprises:
receiving a first downlink control information message in a first downlink subframe, the first downlink control information message comprising the first explicit indication, the first explicit indication being an indication of the first set of feedback information codebook sizes, where the first set of feedback information codebook sizes includes a first codebook size that is greater than or equal to a number of information bits to be transmitted in an uplink channel transmission based on a number of downlink assignments transmitted to the wireless device in the first downlink subframe; and
receiving a second downlink control information message in a second downlink subframe, the second downlink control information message comprising the second explicit indication, the second explicit indication being an indication of the second set of feedback information codebook sizes, where the second set of feedback information codebook sizes includes a second codebook size that is greater than or equal to an accumulated number of information bits to be transmitted in the uplink channel transmission based on the number of downlink assignments transmitted to the wireless device in the first downlink subframe and the second downlink subframe; and
receiving the plurality of downlink assignments comprises:
receiving at least one first downlink assignment of the plurality of downlink assignments in the first downlink control information message in the first downlink subframe; and
receiving at least one second downlink assignment of the plurality of downlink assignments in the second downlink control information message in the second downlink subframe.

2. The method of claim 1, wherein the plurality of predefined sets of feedback information codebook sizes is a plurality of predefined sets of Hybrid Automatic Repeat Request Acknowledgement, HARQ-ACK, codebook sizes and the plurality of predefined feedback information codebook sizes is a plurality of predefined HARQ-ACK codebook sizes.

3. The method of claim 1, wherein the plurality of downlink assignments having comprise a respective plurality of downlink assignment indices that form a received downlink assignment index sequence;
the method further comprising:
determining the number of information bits to be transmitted in the uplink channel transmission including information bits for any missing downlink assignments as identified based on the received downlink assignment index sequence as compared to a defined downlink assignment index ordering;
determining a smallest codebook size in a set of feedback information codebook sizes indicated by one of the one or more indications that is greater than or equal to the determined number of information bits to be transmitted in the uplink channel transmission;
encoding the determined number of information bits using the determined smallest codebook size to provide encoded information bits; and
transmitting the uplink channel transmission, the uplink channel transmission comprising the encoded information bits.

4. The method of claim 3, wherein the plurality of predefined sets of feedback information codebook sizes is a plurality of predefined sets of Hybrid Automatic Repeat Request Acknowledgement, HARQ-ACK, codebook sizes, the plurality of predefined feedback information codebook sizes is a plurality of predefined HARQ-ACK codebook sizes, and the number of information bits to be transmitted in the uplink channel transmission is a number of HARQ-ACK bits.

5. The method of claim 3, wherein determining the smallest codebook size in the set of feedback information codebook sizes indicated by the one of the one or more indications that is greater than or equal to the determined number of information bits to be transmitted in the uplink channel transmission comprises:
determining the smallest codebook size in the set of feedback information codebook sizes indicated by a most recent explicit indication received by the wireless device in a most recent downlink subframe comprising at least one downlink assignment for the wireless device.

6. The method of claim 3, wherein determining the smallest codebook size in the set of feedback information codebook sizes indicated by the one of the one or more indications that is greater than or equal to the determined number of information bits to be transmitted in the uplink channel transmission comprises:

determining the smallest codebook size in the set of feedback information codebook sizes indicated by the second explicit indication comprised in the second downlink subframe.

7. The method of claim 1, wherein each of the plurality of component carriers for which the plurality of downlink assignments are received is either a Time Division Duplexing, TDD, or a Frequency Division Duplexing, FDD, carrier.

8. The method of claim 1, wherein:
the one or more indications comprise a first implicit indication of the first set of feedback information codebook sizes from among the plurality of predefined sets of feedback information codebook sizes and a second implicit indication of the second set of feedback information codebook sizes from among the plurality of predefined sets of feedback information codebook sizes; and
receiving the one or more indications of the one or more sets of feedback information codebook sizes from among the plurality of predefined sets of feedback information codebook sizes comprises:
receiving the first downlink control information message in the first downlink subframe, the first downlink control information message comprising the first implicit indication, the first implicit indication being an implicit indication of the first set of feedback information codebook sizes, where the first set of feedback information codebook sizes includes the first codebook size that is greater than or equal to the number of information bits to be transmitted in the uplink channel transmission based on the number of downlink assignments transmitted to the wireless device in the first downlink subframe; and
receiving the second downlink control information message in the second downlink subframe, the second downlink control information message comprising the second implicit indication, the second implicit indication being an implicit indication of the second set of feedback information codebook sizes, where the second set of feedback information codebook sizes includes the second codebook size that is greater than or equal to the accumulated number of information bits to be transmitted in the uplink channel transmission based on the number of downlink assignments transmitted to the wireless device in the first downlink subframe and the second downlink subframe.

9. A wireless device for a cellular communications network, comprising:
a transceiver;
a processor; and
memory comprising instructions executable by the processor, whereby the wireless device is operable to:
receive, from the cellular communications network, an indication of one of a plurality of predefined sets of feedback information codebook sizes, the plurality of predefined sets of feedback information codebook sizes being disjoint subsets of a plurality of predefined feedback information codebook sizes; and
receive, from the cellular communications network, a plurality of downlink assignments for a plurality of component carriers;
wherein:
the wireless device is operable to receive the indication of the one of the plurality of predefined sets of feedback information codebook sizes by being operable to receive one or more indications of one or more sets of feedback information codebook sizes from among the plurality of predefined sets of feedback information codebook sizes;
the one or more indications comprise a first explicit indication of a first set of feedback information codebook sizes from among the plurality of predefined sets of feedback information codebook sizes and a second explicit indication of a second set of feedback information codebook sizes from among the plurality of predefined sets of feedback information codebook sizes;
the wireless device is operable to receive the one or more indications by being operable to:
receive a first downlink control information message in a first downlink subframe, the first downlink control information message comprising the first explicit indication, the first explicit indication being an indication of the first set of feedback information codebook sizes, where the first set of feedback information codebook sizes includes a first codebook size that is greater than or equal to a number of information bits to be transmitted in an uplink channel transmission based on a number of downlink assignments transmitted to the wireless device in the first downlink subframe; and
receive a second downlink control information message in a second downlink subframe, the second downlink control information message comprising the second explicit indication, the second explicit indication being an indication of the second set of feedback information codebook sizes, where the second set of feedback information codebook sizes includes a second codebook size that is greater than or equal to an accumulated number of information bits to be transmitted in the uplink channel transmission based on the number of downlink assignments transmitted to the wireless device in the first downlink subframe and the second downlink subframe; and
the wireless device is operable to receive the plurality of downlink assignments by being operable to:
receive at least one first downlink assignment of the plurality of downlink assignments in the first downlink control information message in the first downlink subframe; and
receive at least one second downlink assignment of the plurality of downlink assignments in the second downlink control information message in the second downlink subframe.

10. A method of operation of a radio access node in a cellular communications network, comprising:
providing, to a wireless device, an indication of one of a plurality of predefined sets of feedback information codebook sizes, the plurality of predefined sets of feedback information codebook sizes being disjoint subsets of a plurality of predefined feedback information codebook sizes; and
transmitting, to the wireless device, a plurality of downlink assignments for a plurality of component carriers;
wherein:
providing the indication of the one of the plurality of predefined sets of feedback information codebook sizes comprises providing one or more indications of one or more sets of feedback information codebook sizes from among the plurality of predefined sets of feedback information codebook sizes;

the one or more indications comprise a first explicit indication of a first set of feedback information codebook sizes from among the plurality of predefined sets of feedback information codebook sizes and a second explicit indication of a second set of feedback information codebook sizes from among the plurality of predefined sets of feedback information codebook sizes;

providing the one or more indications comprises:
transmitting a first downlink control information message in a first downlink subframe, the first downlink control information message comprising the first explicit indication, the first explicit indication being an indication of the first set of feedback information codebook sizes, where the first set of feedback information codebook sizes includes a first codebook size that is greater than or equal to a number of information bits to be transmitted in an uplink channel transmission based on a number of downlink assignments transmitted to the wireless device in the first downlink subframe; and transmitting a second downlink control information message in a second downlink subframe, the second downlink control information message comprising the second explicit indication, the second explicit indication being an indication of the second set of feedback information codebook sizes, where the second set of feedback information codebook sizes includes a second codebook size that is greater than or equal to an accumulated number of information bits to be transmitted in the uplink channel transmission based on the number of downlink assignments transmitted to the wireless device in the first downlink subframe and the second downlink subframe; and transmitting the plurality of downlink assignments comprises:
transmitting at least one first downlink assignment of the plurality of downlink assignments in the first downlink control information message in the first downlink subframe; and transmitting at least one second downlink assignment of the plurality of downlink assignments in the second downlink control information message in the second downlink subframe.

11. The method of claim 10, wherein the plurality of predefined sets of feedback information codebook sizes is a plurality of predefined sets of Hybrid Automatic Repeat Request Acknowledgement, HARQ-ACK, codebook sizes and the plurality of predefined feedback information codebook sizes is a plurality of predefined HARQ-ACK codebook sizes.

12. The method of claim 10, wherein the plurality of downlink assignments comprise a respective plurality of downlink assignment indices that form a received downlink assignment index sequence;

the method further comprising:
receiving the uplink channel transmission from the wireless device, the uplink channel transmission comprising encoded information bits; and
decoding the encoded information bits.

13. The method of claim 12, wherein the plurality of predefined sets of feedback information codebook sizes is a plurality of predefined sets of Hybrid Automatic Repeat Request Acknowledgement, HARQ-ACK, codebook sizes, the plurality of predefined feedback information codebook sizes is a plurality of predefined HARQ-ACK codebook sizes, and the encoded information bits comprise a number of encoded HARQ-ACK bits.

14. The method of claim 10, wherein each of the plurality of component carriers for which the plurality of downlink assignments are transmitted is either a Time Division Duplexing, TDD, or a Frequency Division Duplexing, FDD, carrier.

15. The method of claim 10, wherein:
the one or more indications comprise a first implicit indication of the first set of feedback information codebook sizes from among the plurality of predefined sets of feedback information codebook sizes and a second implicit indication of the second set of feedback information codebook sizes from among the plurality of predefined sets of feedback information codebook sizes; and providing the one or more indications of the one or more sets of feedback information codebook sizes from among the plurality of predefined sets of feedback information codebook sizes comprises:
transmitting the first downlink control information message in the first downlink subframe, the first downlink control information message comprising the first implicit indication, the first implicit indication being an implicit indication of the first set of feedback information codebook sizes, where the first set of feedback information codebook sizes includes the first codebook size that is greater than or equal to the number of information bits to be transmitted in the uplink channel transmission based on the number of downlink assignments transmitted to the wireless device in the first downlink subframe; and transmitting the second downlink control information message in the second downlink subframe, the second downlink control information message comprising the second implicit indication, the second implicit indication being an implicit indication of the second set of feedback information codebook sizes, where the second set of feedback information codebook sizes includes the second codebook size that is greater than or equal to the accumulated number of information bits to be transmitted in the uplink channel transmission based on the number of downlink assignments transmitted to the wireless device in the first downlink subframe and the second downlink subframe.

16. A radio access node for a cellular communications network, comprising:
a transceiver;
a processor; and
memory comprising instructions executable by the processor whereby the radio access node is operable to:
provide, to a wireless device, an indication of one of a plurality of predefined sets of feedback information codebook sizes, the plurality of predefined sets of feedback information codebook sizes being disjoint subsets of a plurality of predefined feedback information codebook sizes; and
transmit, to the wireless device, a plurality of downlink assignments for a plurality of component carriers;
wherein:
the radio access node is operable to provide the indication of the one of the plurality of predefined sets of feedback information codebook sizes by being operable to provide one or more indications of one or more sets of feedback information codebook sizes from among the plurality of predefined sets of feedback information codebook sizes;

the one or more indications comprise a first explicit indication of a first set of feedback information codebook sizes from among the plurality of predefined sets of feedback information codebook sizes and a second explicit indication of a second set of feedback information codebook sizes from among the plurality of predefined sets of feedback information codebook sizes;

the radio access node is operable to provide the one or more indications by being operable to:

transmit a first downlink control information message in a first downlink subframe, the first downlink control information message comprising the first explicit indication, the first explicit indication being an indication of the first set of feedback information codebook sizes, where the first set of feedback information codebook sizes includes a first codebook size that is greater than or equal to a number of information bits to be transmitted in an uplink channel transmission based on a number of downlink assignments transmitted to the wireless device in the first downlink subframe; and transmit a second downlink control information message in a second downlink subframe, the second downlink control information message comprising the second explicit indication, the second explicit indication being an indication of the second set of feedback information codebook sizes, where the second set of feedback information codebook sizes includes a second codebook size that is greater than or equal to an accumulated number of information bits to be transmitted in the uplink channel transmission based on the number of downlink assignments transmitted to the wireless device in the first downlink subframe and the second downlink subframe; and the radio access node is operable to transmit the plurality of downlink assignments by being operable to:

transmit at least one first downlink assignment of the plurality of downlink assignments in the first downlink control information message in the first downlink subframe; and transmit at least one second downlink assignment of the plurality of downlink assignments in the second downlink control information message in the second downlink subframe.

\* \* \* \* \*